(12) United States Patent
Kassai et al.

(10) Patent No.: US 6,899,541 B2
(45) Date of Patent: May 31, 2005

(54) LIFE LOG PRODUCED BY PARENT AND CHILD AND NURTURE UNIT

(75) Inventors: Kenzou Kassai, Osaka (JP); Ichiro Onishi, Osaka (JP); Kazunori Sawada, Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 10/302,430

(22) Filed: Nov. 22, 2002

(65) Prior Publication Data

US 2003/0099922 A1 May 29, 2003

(30) Foreign Application Priority Data

Nov. 27, 2001 (JP) .................................... P2001-361007

(51) Int. Cl.⁷ .............................................. G09B 19/00
(52) U.S. Cl. ...................... 434/236; 446/227; 281/15.1
(58) Field of Search ..................... 434/236; 281/15.1, 281/29, 27.1, 31, 36–38; D19/26, 32; 446/227; 297/136, DIG. 11

(56) References Cited

U.S. PATENT DOCUMENTS

| | | | | |
|---|---|---|---|---|
| 1,368,672 A | * | 2/1921 | Wilkinson ...................... 283/3 |
| 2,310,707 A | * | 2/1943 | Petrie .......................... 281/17 |
| 2,650,764 A | * | 9/1953 | Pirszel | |
| 2,736,131 A | | 2/1956 | Lewis, Jr. | |
| 3,978,610 A | | 9/1976 | Stubbmann | |
| 4,365,438 A | * | 12/1982 | Nelson ........................ 46/202 |
| 4,553,786 A | | 11/1985 | Lockett, III et al. | |
| 4,627,588 A | | 12/1986 | Block | |
| 4,669,754 A | * | 6/1987 | Lalonde ........................ 283/67 |
| 4,965,948 A | * | 10/1990 | Ruebens ....................... 40/537 |
| 5,059,149 A | * | 10/1991 | Stone .......................... 446/73 |
| 5,090,561 A | * | 2/1992 | Spector ....................... 206/313 |
| 5,411,315 A | | 5/1995 | Greenwood | |
| 5,947,522 A | * | 9/1999 | Boehm ........................ 281/22 |
| 6,296,112 B1 | * | 10/2001 | Pettey ........................ 206/232 |
| 6,325,348 B1 | | 12/2001 | Turner | |
| 6,478,281 B1 | | 11/2002 | Turner | |
| 6,544,037 B2 | * | 4/2003 | Fink ........................... 434/162 |
| 6,715,826 B2 | * | 4/2004 | Bellows et al. ............. 297/136 |
| 2001/0010351 A1 | | 8/2001 | Schutze | |

FOREIGN PATENT DOCUMENTS

| | | |
|---|---|---|
| JP | 09084964 | 3/1997 |
| JP | 10192101 | 7/1998 |
| JP | 10192560 | 7/1998 |

OTHER PUBLICATIONS www.tapisinc.com/scrapbook_specialty.php.*

* cited by examiner

Primary Examiner—Derris H. Banks
Assistant Examiner—J Williams
(74) Attorney, Agent, or Firm—W. F. Fasse; W. G. Fasse

(57) ABSTRACT

The life log or journal is directed to produce a record of the life of a child by parent and child, explicitly divided into a fetus era, newborn era, school era, grown-up era, and mature-age era, guiding a parent to write down a record when the child is too young to write for himself/herself, and guiding the child to write for himself/herself when the child grows up. In the region guiding the parent to write down a record, an instruction is printed to inspire the parent to facilitate writing down events of the child's development on occasion together with the parent's feelings at that time. As a result, a life log can be produced, leaving the affection devoted from the parent to child in a visual form so that the parent and child can share affection, joy and emotions throughout the childhood and adulthood of the child.

3 Claims, 25 Drawing Sheets

LIFE LOG PRODUCED BY PARENT AND CHILD AND NURTURE UNIT

BACKGROUND OF THE INVENTION

1. Field of the Invention

The present invention relates to a life log and a nurture unit to retain memories of affection received from parent to child during childhood continuously in the child's mind even after growing up.

2. Description of the Background Art

The mother and father learning of pregnancy will feel excited about conceiving life as the fruit of union and wish for the baby in the womb to grow in well-being. When the parent first holds the baby in his/her arms, the happiness of the newborn is earnestly craved for. This sincere and devoted affection towards the child should never be forgotten. By conveying such affectionate feelings to the child, the child will become conscious of the parents' love to grow up with a healthy mind.

It is the common wish of the whole earth for the development of children with healthy mental conditions. It is said that the era of a child 0–3 years in age is the most important period in which the child becomes conscious of one's self. In other words, this is the period where development of the brain is most notable. It is extremely important for the parent to devote deep care with an affectionate heart for the child during this period for the purpose of the infant to grow up in a healthy condition with an affectionate heart. If the parent and child can commonly share love and emotions together, a good environment can be established for the mind.

Particularly, it is desirable to retain the memories of affection devoted from the parent to the child up to the age of three continuously in the child's mind even after growing up. The child can grow up with a healthy character if the child is provided with remembrance of the affection devoted from his/her parent.

The diary is known as an item to record daily events and remarks. Such a diary is mainly written and intended to be read thereafter only by the recorder.

Therefore, ones personal diary generally will not be exposed to others. This applies even between the parent and child. In general, the parent will not positively show his/her diary recording his/her daily feelings or observations of events to others.

In Japan, the maternity passbook is known as a record of the growth of the fetus or baby. This maternity passbook is a pocketbook issued by the governor of prefectural and city governments to one who has given notice of pregnancy according to the Maternal and Child Health Law in Japan. When the expectant mother or baby receives health examinations or health guidance from a doctor, a maternity nurse, a public health nurse or the like, notes required for guidance are recorded. This maternity passbook is used only during a limited period from the era of fetus up to the infant era, and is recorded to monitor the health condition during the fetus and infant period of the child.

The term "parent", "father" and "mother" used in the present specification implies any caregiver who gives physical and/or emotional care and support to the child.

SUMMARY OF THE INVENTION

The life log of the present invention is intended to be completely different from that of the above-described general diary and maternity passbook.

An object of the present invention is to provide "a life log", leaving the affection devoted from parent to child in a visual form such that the parent and child can share the affection, joy and emotions.

Another object of the present invention is to provide a nurture unit that can be cherished from the era of fetus to the era of mature age to allow memories of childhood happiness to be sustained all through life.

The inventors of the present application considered how good it would be if people such as their parents who have cared for them with affection during their childhood could stay nearby forever. To this end, the inventors felt that it would be comforting and heartwarming to produce a book marked with deep affection and memories of people who have provided deep care, a symbol character wishing for the happiness of the child and a nurture product of various types, and combine these three depending upon their age to keep them nearby all through their lives from the earliest period of life.

The life log produced by parent and child of the present invention is explicitly divided into a region to guide a parent to write down a record when the child is too young to write for herself/himself, and a region to guide the child to write down a record himself/herself when the child has grown older, for the parent and child to produce a record of the child's life.

Specifically, the era is explicitly divided into the fetus era, the newborn era, the school era, the grown-up era, and the mature-age era. During the fetus era, the newborn era and the school era, the parent is guided to write down a record. During the grown-up era and mature-age era, the child is guided to write down a record himself/herself.

Preferably, a symbol character representing an affectionate heart is placed on the front cover of the log based on the wish to access the log with heartwarming emotions. This symbol character appears on each page where the parent and child write down a record.

Further preferably, a beacon or instruction is printed to inspire the parent to facilitate writing down an event of the child's development on occasion together with the parent's feeling at that time in the region to guide the parent to write down a record. To further facilitate writing in such a case, an onomatopoetic word representing the bearings of the child or the parent's feelings at that time during the development stage of the child is printed in advance in the region to guide a parent to write down a record.

Further preferably, an information recording medium recorded with a musical output based on an actual sound of moving water is bound to the life log. The information recording medium is typically a compact disc. Preferably, a symbol character representing an affectionate heart is printed on the surfaces of the compact disc.

The nurture unit of the present invention is directed to retain memories of affection devoted from parent to child continuously in the child's mind even after growing up, and includes a life log, a nurture product, and a symbol character.

The life log is explicitly divided into a region to guide a parent to write down a record when the child is too young to write for himself/herself, and a region to guide the child to write down a record himself/herself when the child has grown to be able to write for himself/herself to produce a record of the child's life by both parent and child. The nurture product has a configuration as a playing device when the child is young, and is modified into a configuration as a daily commodity kept nearby when the child has grown-up. The symbol character has been produced as a symbol representative of an affectionate heart.

On the front cover and each page of the life log, a symbol character representative of an affectionate heart appears. The nurture product includes a symbol character representative of an affectionate heart in both states of a playing device configuration and a daily commodity configuration.

Preferably, the nurture unit further includes a compact disc in which is recorded a musical output based on actual sound of water. On the surface of this compact disc is printed a symbol character representing an affectionate heart.

Further preferably, the compact disc recorded with a musical output based on water is bound in the life log.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
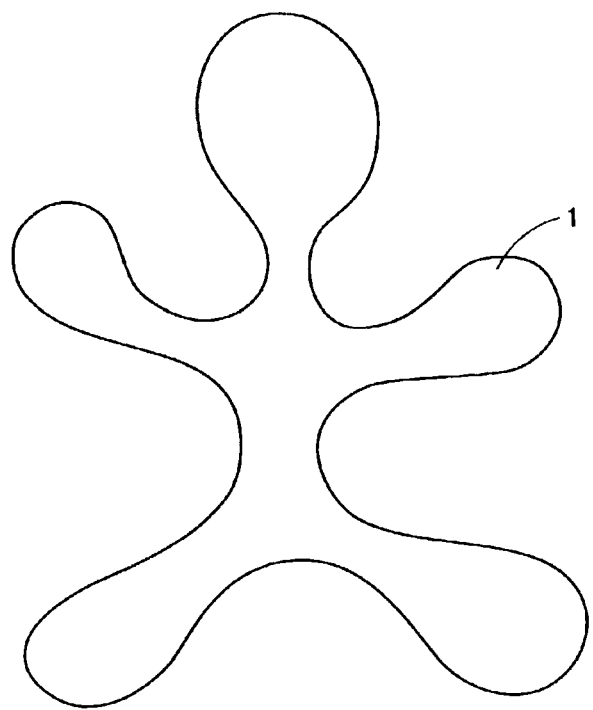
FIG. 1 shows a symbol character of "prayer for children".

The applicant of the present invention developed a character 1 shown in FIG. 1 as "a symbol of prayer for children".

This character 1 is employed in an embodied form on various products. For example, character 1 is employed as a spoon, a pendant top, or accessory taking the form of substantially the shape of character 1. Also, character 1 is employed as a one point mark design or the like printed on nurture products and clothing.

Figure 2:
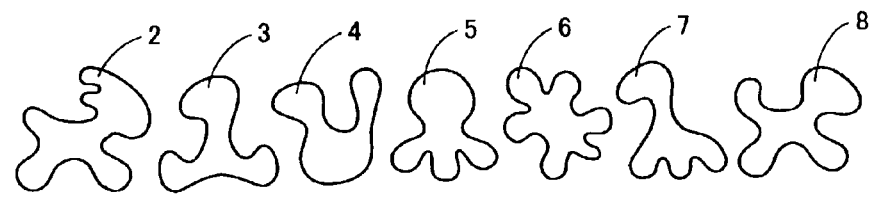
FIG. 2 shows symbol characters representative of "an affectionate heart".

The applicant of the present invention also developed seven types of characters 2–8 shown in FIG. 2 as symbols representing "an affectionate heart". These characters 2–8 are employed in an embodied form in various products. For example, characters 2–8 are employed as suspensive toy animals for mobile toys, stuff toys, one point mark designs printed on nurture products, clothing, and the like.

Figure 3:
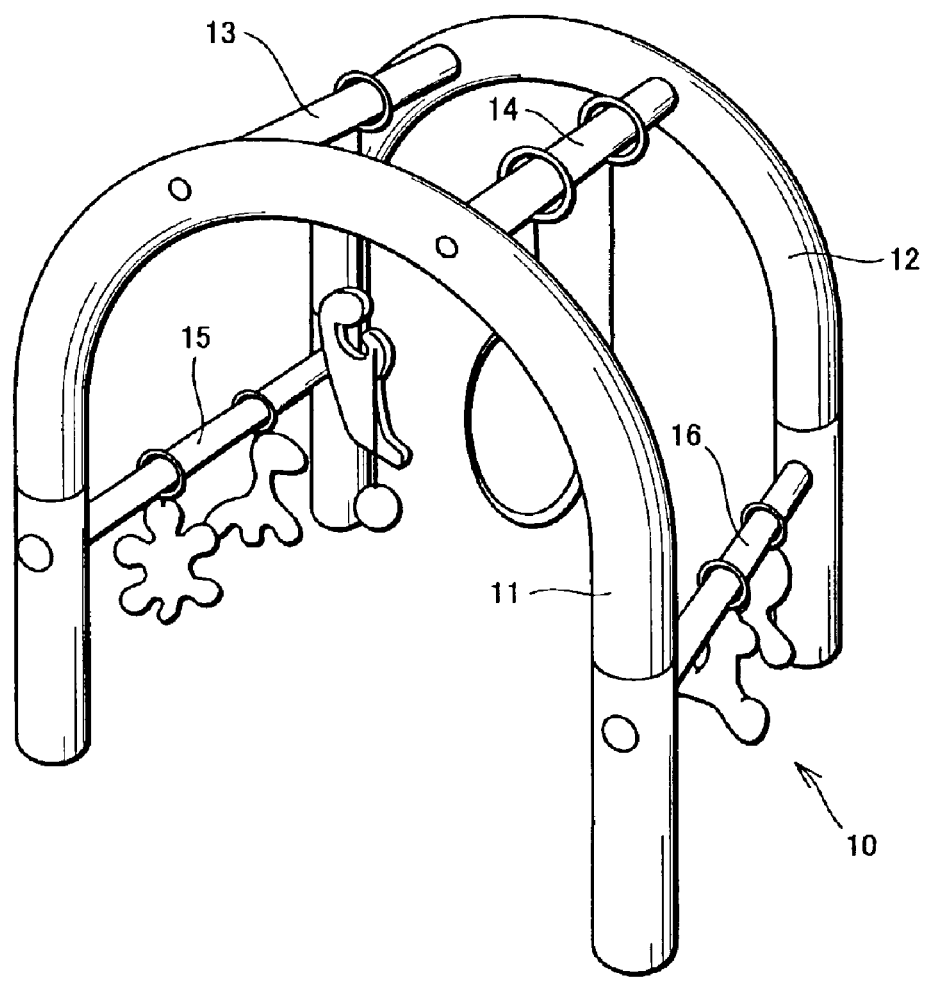
FIG. 3 is a perspective view of a playing device constituting a play gym.
Figure 4:
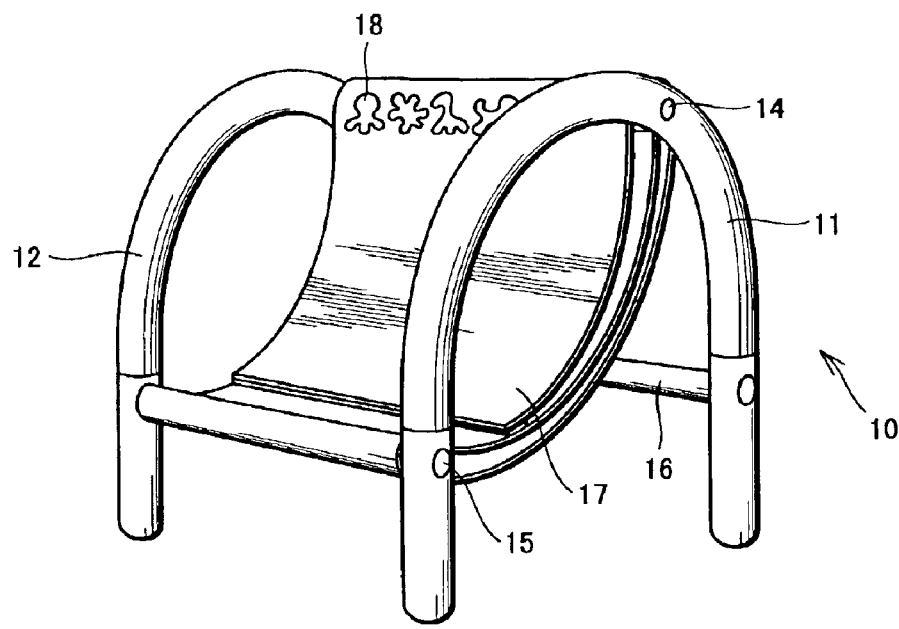
FIG. 4 is a perspective view of a playing device modified into the configuration of a child chair.
Figure 5:
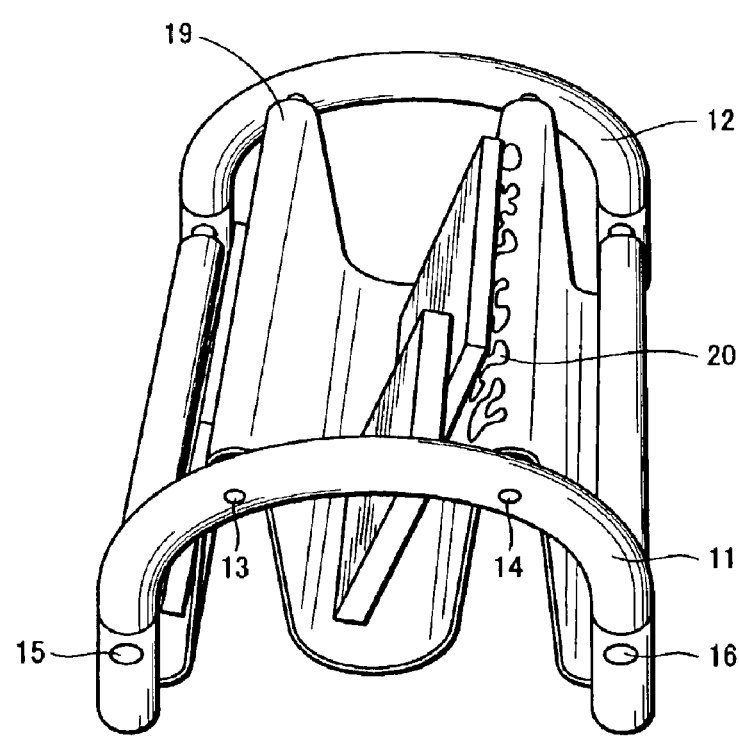
FIG. 5 is a perspective view of a playing device modified into a configuration of a magazine rack.

Referring to FIG. 3, a playing device 10 is configured so as to be modifiable into a configuration of a play gym (FIG. 3), a chair (FIG. 4) and a magazine rack (FIG. 5).

During the babyhood, playing device 10 is used in the configuration of the play gym shown in FIG. 3. Playing device 10 includes a first side strut 11 and a second side strut 12 in the form of an arch, and rods 13, 14, 15 and 16 connected between the side struts. Squeezable figures corresponding to symbol characters representing "an affectionate heart" are hanging from struts 15 and 16. A baby placed beneath the play gym can happily play with his/her parent by watching or touching the suspending figures.

At a more developed stage of the child, playing device 10 can be used as a child seat shown in FIG. 4. One of the four rods 13, 14, 15 and 16, i.e., rod 13 is removed, and a seat member 17 is fixed between two rods 14 and 15. Seat member 17 functions as the seat and back rest of this playing device 10 to be used as a child chair. A symbol character 18 representative of "an affectionate heart" is printed on seat member 17. The child will recall the figures played at a younger age by seeing symbol character 18 printed on seat member 17 to develop an affectionate heart.

At a further higher development stage of the child, playing device 10 can be used in the form of a magazine rack as shown in FIG. 5. A sheet-like member 19 is furnished across the four rods 13, 14, 15 and 16. A diary, a picture book, a magazine or the like can be accommodated therein by means of sheet-like member 19. A symbol character 20 representing "an affectionate heart" is printed on member 19.

Toy device 10 bringing up pleasant memories of playing happily with one's parents during one's babyhood that is the development stage of the brain can be used even after growing up by altering the configuration into a daily commodity such as a chair or magazine rack. Therefore, playing device 10 can be kept nearby to attract ones notice or be touched occasionally. Also, since the symbol character of "an affectionate heart" is continuously visible until one grows up, the pleasant memories with one's parent can be recalled to be conscious of the heartwarming relationship, invoking development of an affectionate heart.

Figure 6:
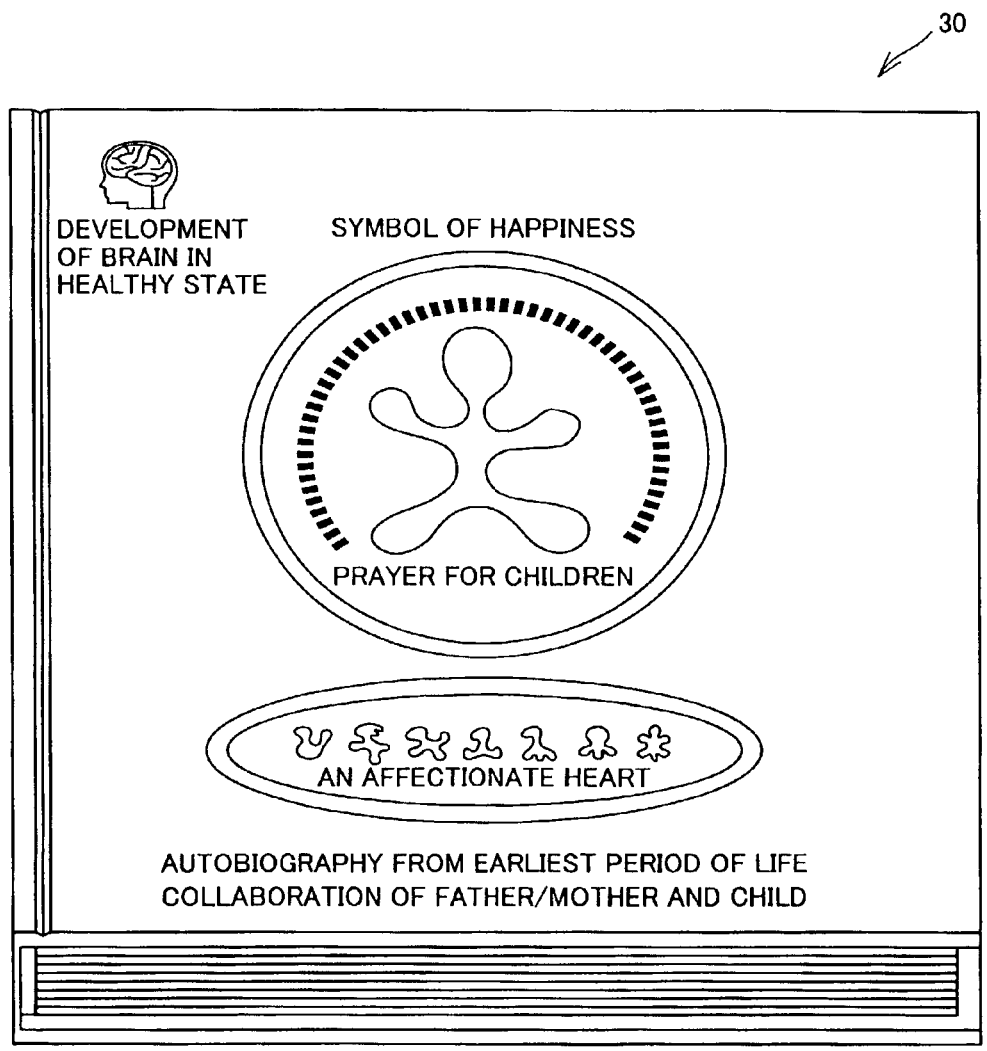
FIG. 6 is a perspective view of a life log.
Figure 7:
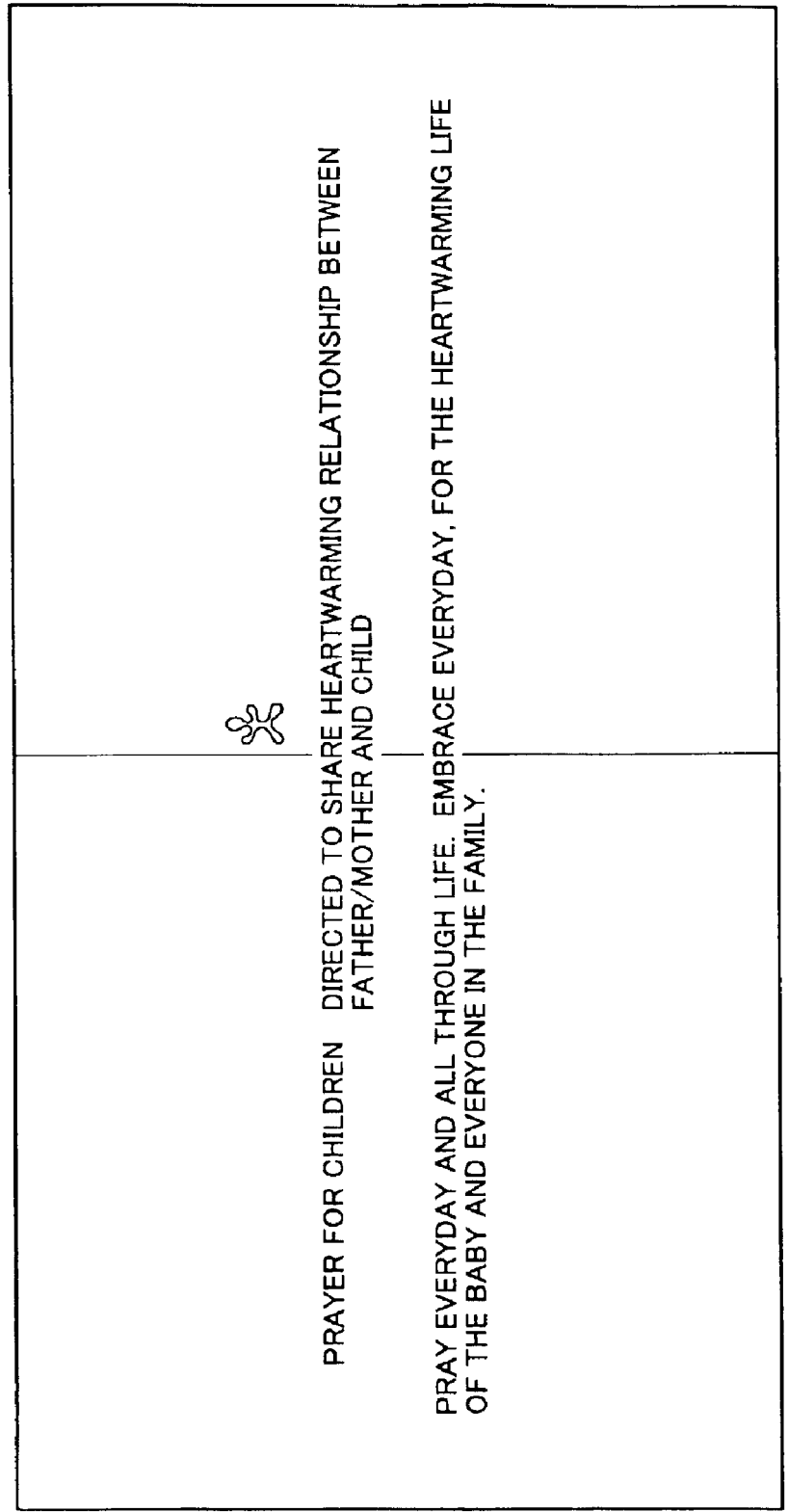
FIG. 7 shows a double spread page of the life log appearing when the front cover is turned over.
Figure 8:
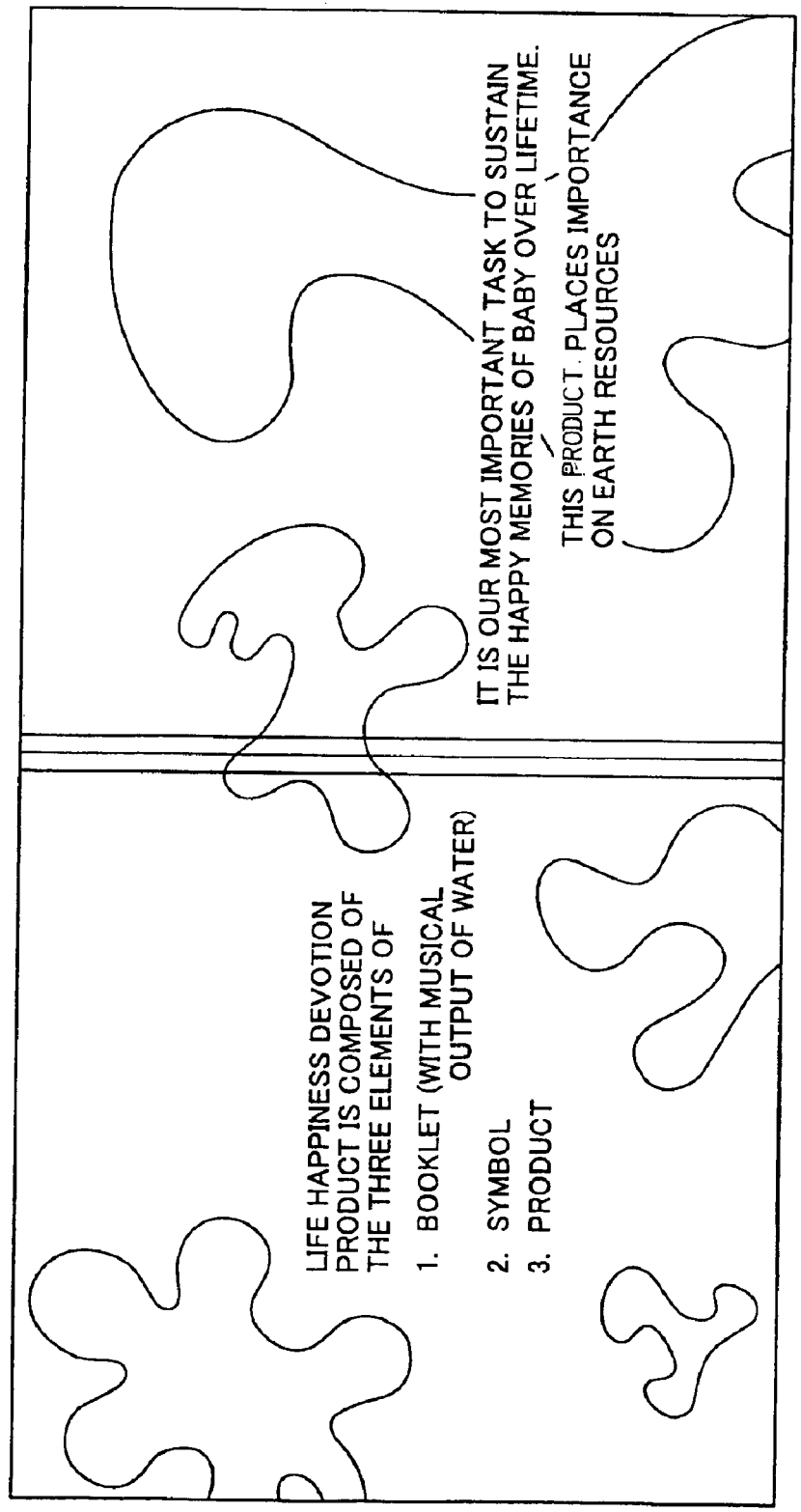
FIG. 8 shows a page describing a life happiness devotion product.

A life log 30 shown in FIG. 6 is directed to retain the devotion provided from parent to child in a visual form so that the parent and child can share affection, joy, and emotions. FIGS. 7–27 represent selected pages from a bound log. The main features of this log are set forth below.

1. It is an autobiography starting from the fetus era, based on collaboration of parent and child. During the age when the child is too young to write for himself/herself, the parent writes down a record. At the later age when the child grows up, the child writes for himself/herself.

2. It is a record over lifetime, starting from the earliest period of life up to the mature age.

3. It is configured to leave the deep affection from parent to child in a visual form so that the deep care received during one's babyhood from the caregiver can be retained continuously in one's mind even after growing up.

4. By showing on the front cover and each page on which a record is to be written a symbol character imprinted on the mind of the child during the stage of development of the brain in the infant period, the deep affection and tenderness as well as heartwarming emotions between parent and child are invoked.

5. An information record medium recorded with a musical output based on actual sound of water such as the trickle of water and babbling stream is bound in the life log.

6. Life is divided into the fetus era, the newborn era, the school era, the grown-up era, and the mature-age era, wherein guidance is provided to direct the parent to write down a record from the earliest period of life up to school age, and direct the child to write for himself/herself from the grown-up age to the mature-age era.

7. Memorable events from the fetus era up to the school era during which physical and emotional contact between parent and child can be developed with affection are printed in advance. A beacon to inspire the parent to write down his/her sincere feelings at that time is included.

8. Onomatopoetic words representing the child's bearings and parent's feelings on occasion are printed in advance to produce an environment to facilitate writing.

The features of the life log will be described in detail with reference to the following drawings.

FIG. 6

The front cover of the log. A symbol character representing "prayer for children", and a symbol character representing "an affectionate heart" are printed to guide the parent and child to leave a record with deep affection and heartwarming emotions.

These symbol characters also appear on a playing device used for both the parent and child to play, and on nurture products used by the child. Furthermore, the symbol character appears on personal belongings such as a pendant and necklace. The symbol character also appears on a nurture product such as playing device 10 shown in FIGS. 3–5, both in a configuration as a playing device when the child is small, and as a daily commodity kept nearby when the child grows up. Since the symbol character attached to the nurture product is common to the symbol character appearing on the life log, the symbol character appearing on the front cover of the life log will invoke the memories of the parent and child playing together. The life log can be accessed with an affectionate heart.

On the front cover, the phrases of "Autobiography from the earliest period of life" and "Collaboration of father/mother and child", characteristic of the life log, are printed.

FIG. 7

The first double spread page after turning over the front cover. The symbol character of "prayer for children" as well as the literary phrases set forth below to share the heartwarming emotions are printed on the page.

"Pray everyday and all through life. Embrace everyday, for the heartwarming life of the baby and everyone in the family."

The happiness of parent and child is based on the continuing bond of deep affection. The above phrases are marked on the first double spread page, based on the hope of reviving the sincere affection and care felt at the starting point when writing the log.

FIG. 8

The double spread page shows that the life happiness devotion product is composed of three elements, i.e., "booklet", "symbol" and "product". This page is devised so that "an affectionate heart" is developed by showing a symbol character representative of "an affectionate heart". The life happiness devotion product is envisaged as "the nurture unit" of the present invention.

"Booklet" corresponds to the life log that is the subject of the present invention. By leaving a message to the child or noting down his/her feelings at that time together with, for example, a picture, the affection towards the child can be continuously sustained. This devotion can be conveyed to the child in a visual form.

The symbol character of "prayer for children" and the symbol character representative of "an affectionate heart" are to appear on the product that is to be kept nearby all through life or in the log. By having access to such characters in a natural form continuously on a daily basis, the feelings of "prayer for children" and "an affectionate heart" can be developed.

The product used during the childhood can be continuously used even after growing up to invoke the memories of childhood playing together with one's parent to develop heartwarming emotions. The product may be altered in configuration in accordance with the development of the child, or may be a personal belonging such as a necklace or pendant representing the symbol character. On the part of the parent or caregiver, affection towards the child can be continuously sustained through this type of product.

Preferably, the "product" is a nurture product that has a configuration as a playing device when the child is an infant, and modified into a configuration as a daily commodity that can be kept nearby after growing up. This nurture product includes a symbol character in both states of the configuration as a playing device and as a daily commodity.

It is the wish of the inventors that the happy memories of childhood can be retained all through life by means of the "booklet", "symbol" and "product".

FIG. 9

Figure 9:
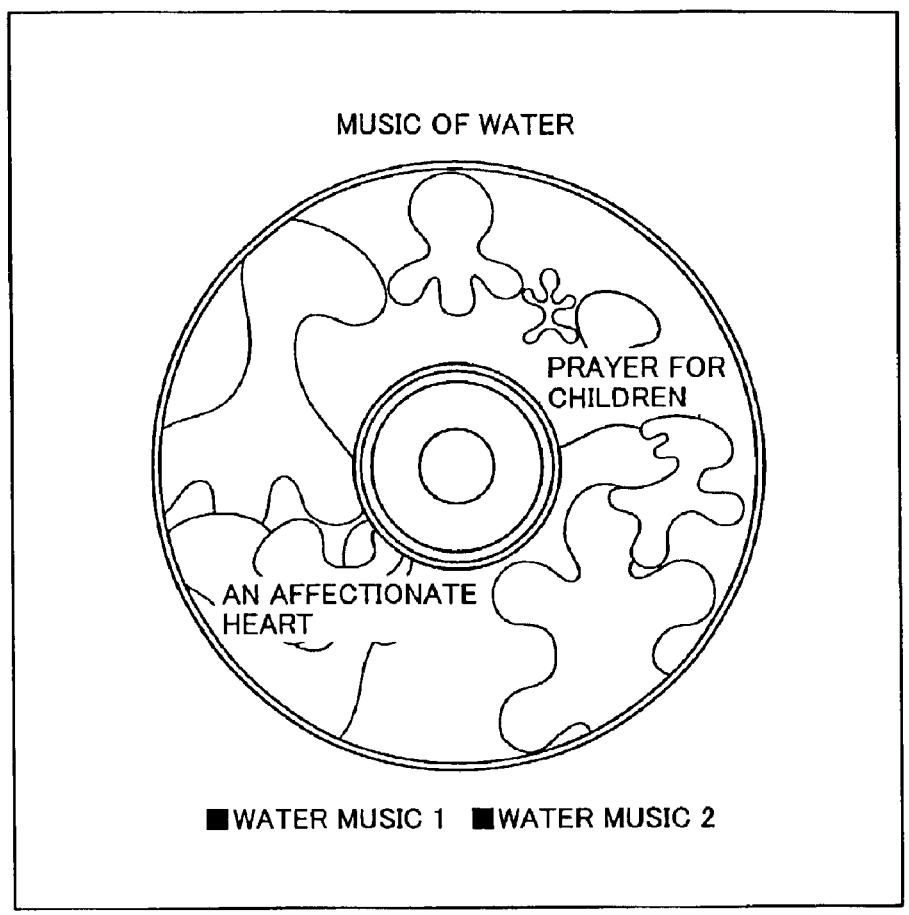
FIG. 9 shows a page where a compact disc is bound.

An information record medium recorded with the actual sound of water such as the trickle and drops of water is bound in one of the pages of the log. In the embodiment of FIG. 9, a thin compact disc convenient for being bound in the log is employed as the information record medium. On the surface of the compact disc, the symbol characters of "prayer for children" and "an affectionate heart" are printed. As another example of an information record medium, a magnetic tape cassette may be employed.

It is said that the deep water of the sea has a component approximating that of the amniotic fluid of the womb. The reason why we are comforted and feel relaxed by various images corresponding to water is that we know water, starting as one drop to eventually constitute a river flowing into the sea, is the root of life.

Music based on the actual sound of water will give comfort and relaxation. The bond between the baby in the womb and the mother can be deepened by listening to such comforting music during pregnancy.

Figure 10:
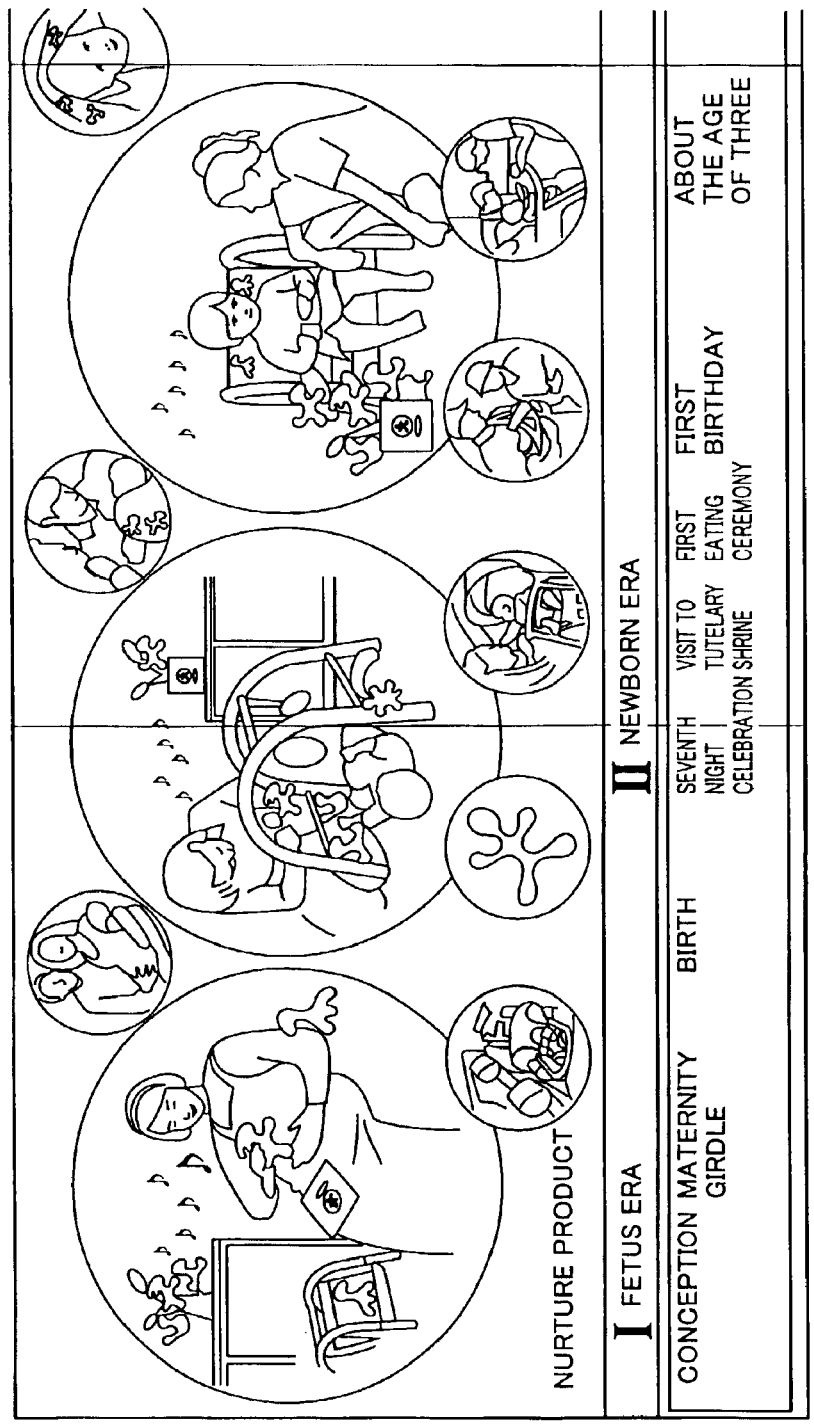
FIG. 10 shows a page illustrating the fetus era and newborn era.
Figure 11:
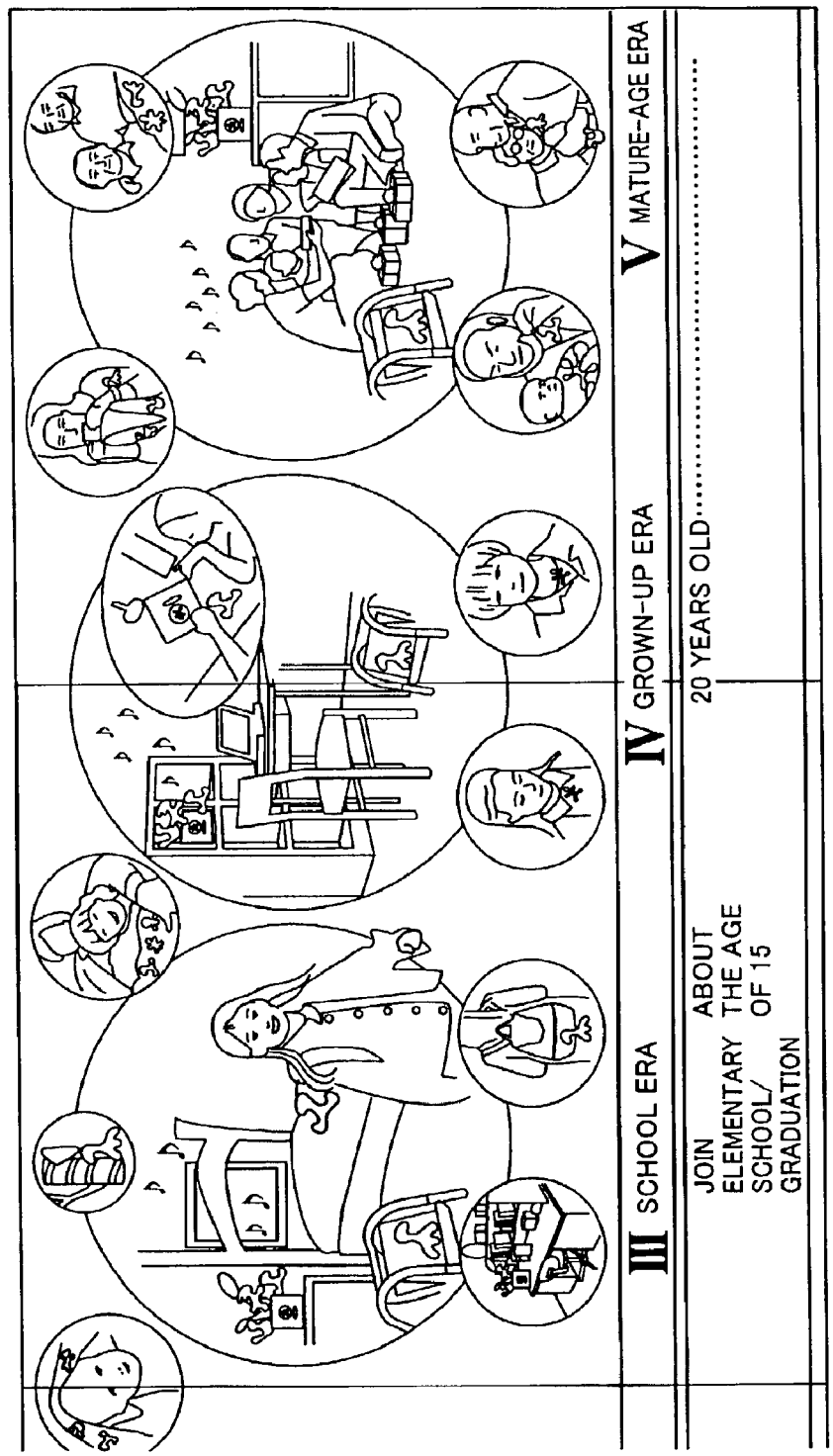
FIG. 11 shows a page illustrating the school era, the grown-up era and the mature-age era.
Figure 12:
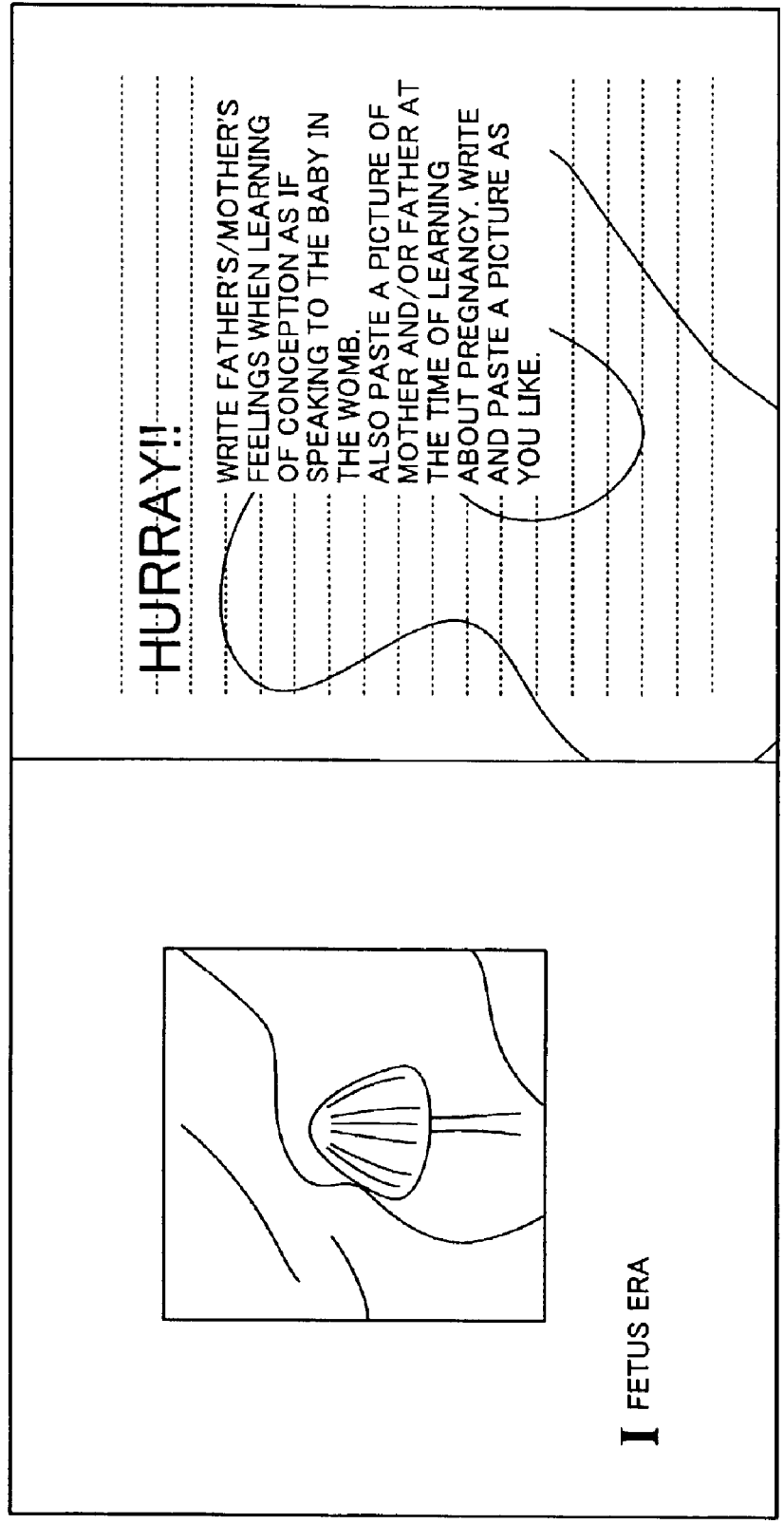
FIG. 12 shows the first double spread page of a record starting from the fetus era.
Figure 13:
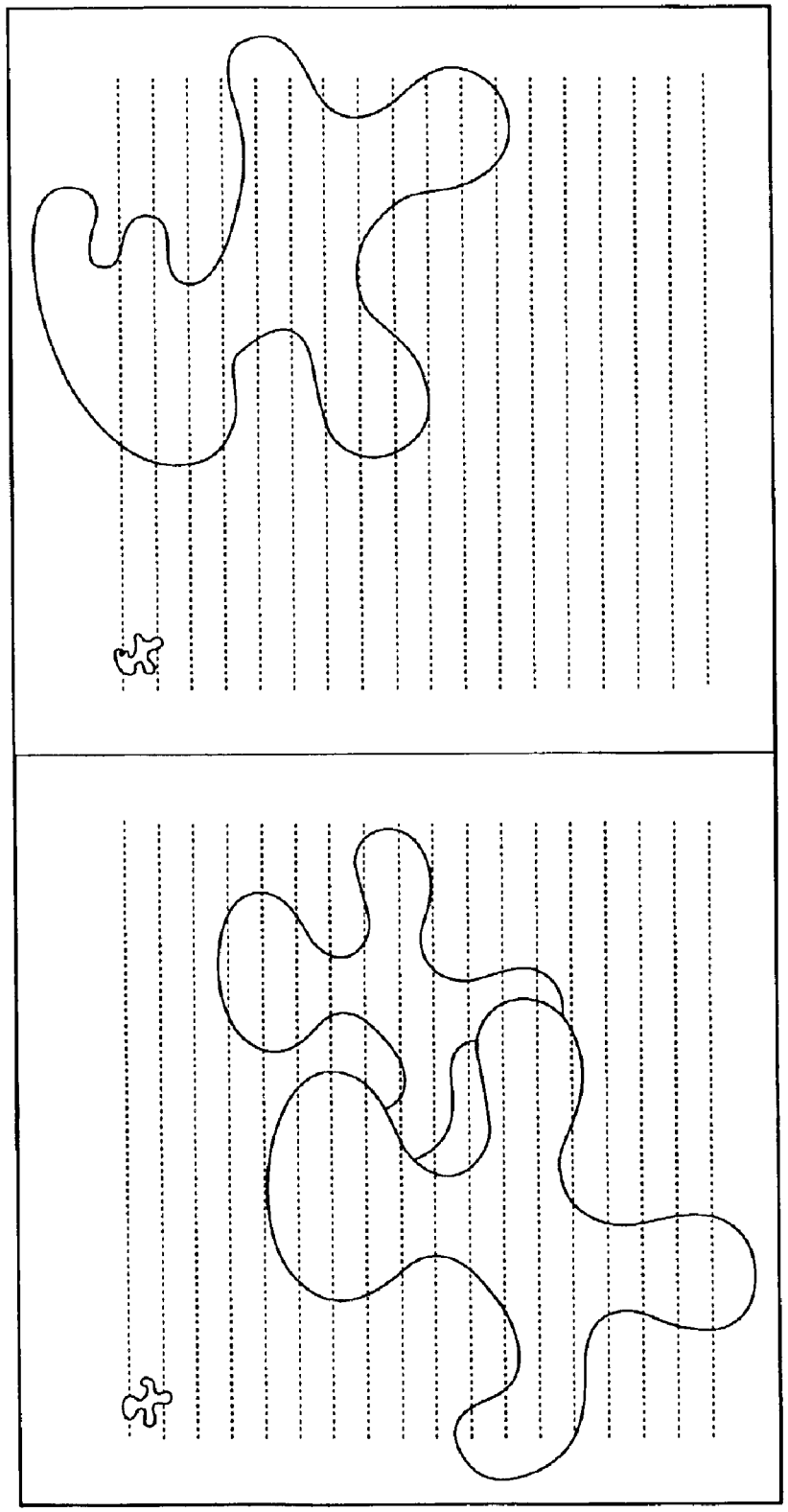
FIG. 13 shows a page illustrating a region where the parent can write down a record arbitrarily.
Figure 14:
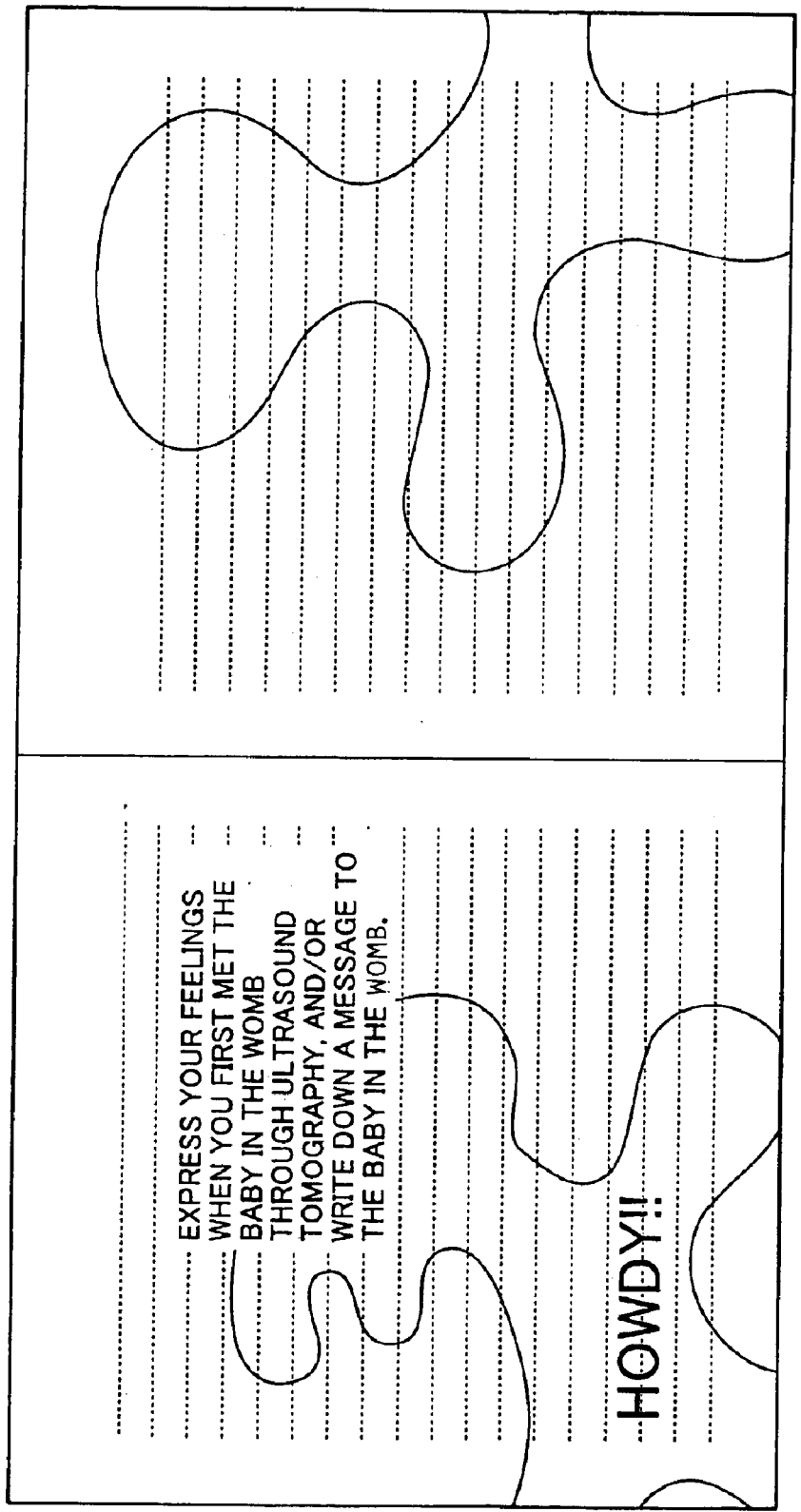
FIGS. 14, 15 and 16 show a double spread page having beacons and onomatopoetic words printed in advance.
Figure 15:
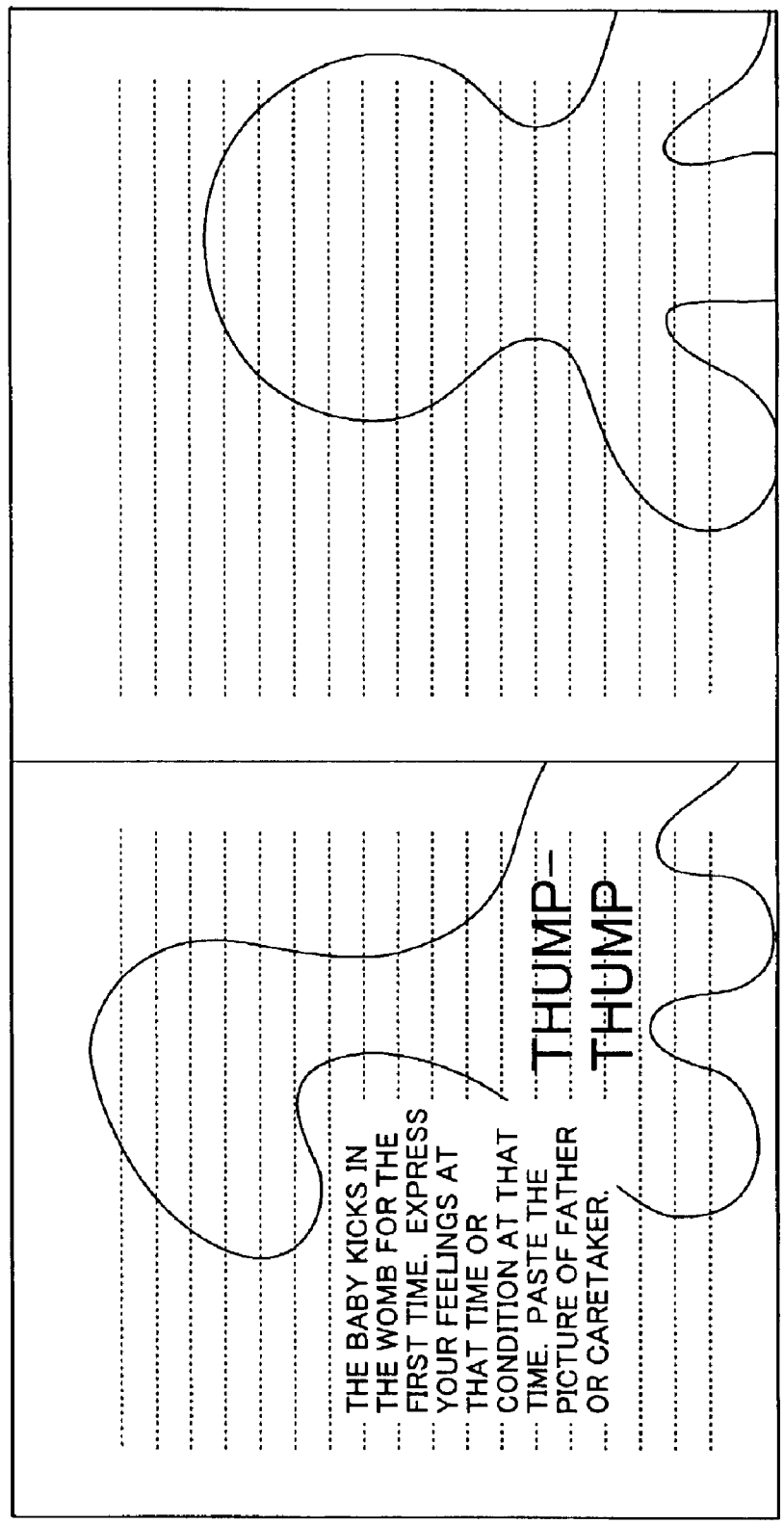
Figure 16:
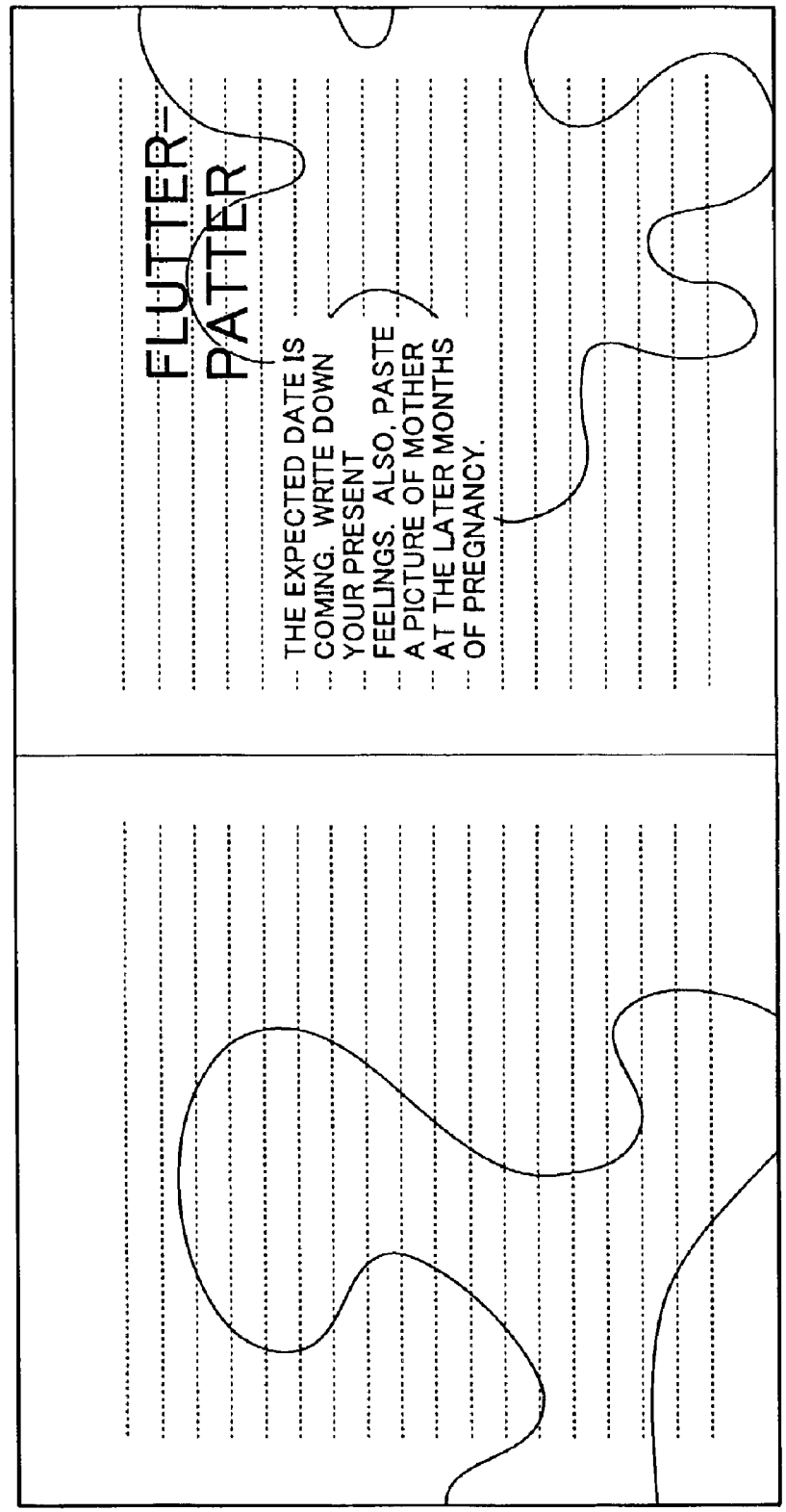
Figure 17:
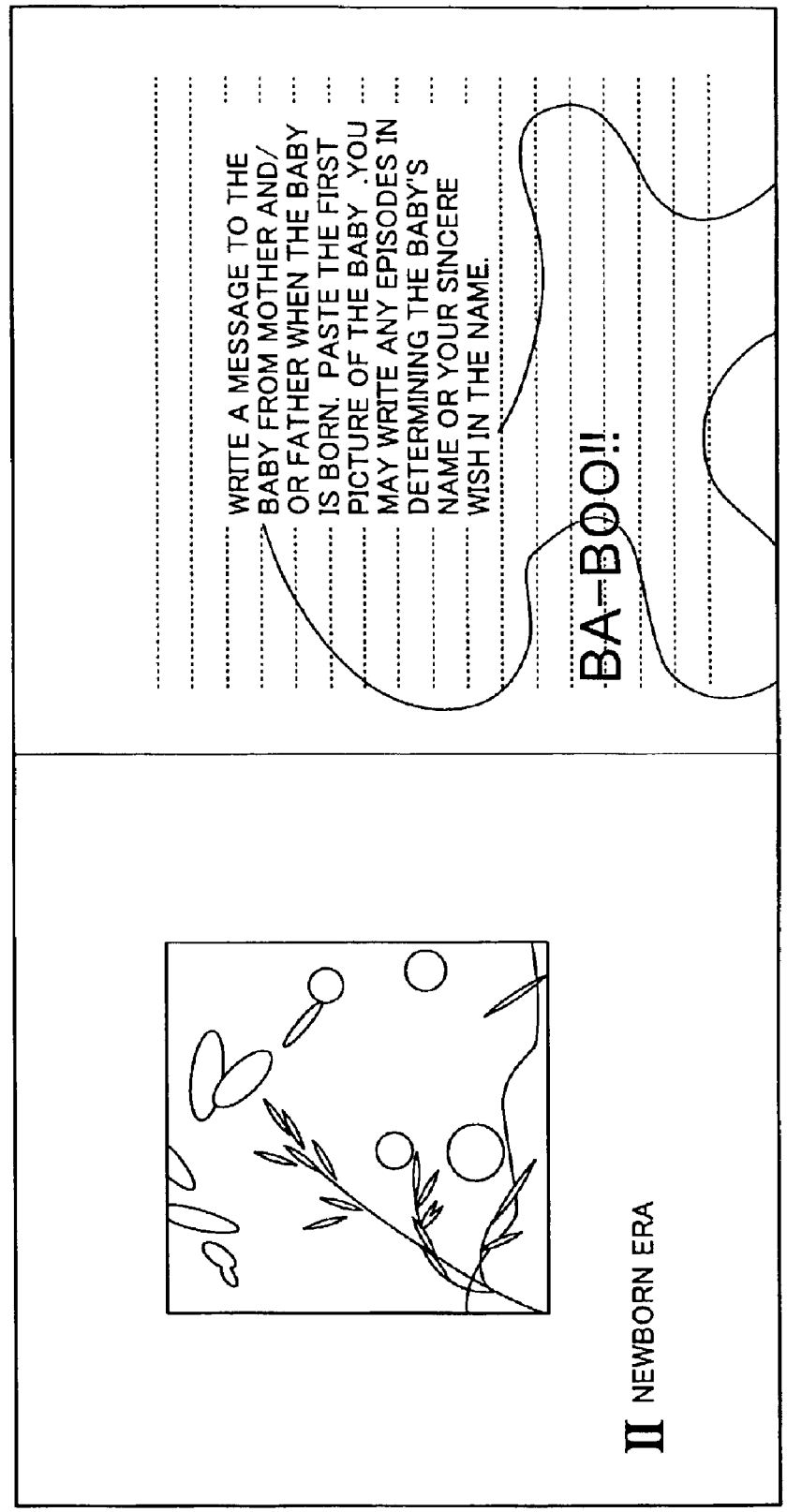
FIG. 17 shows a double spread page illustrating the beginning of a record of the newborn era.
Figure 18:
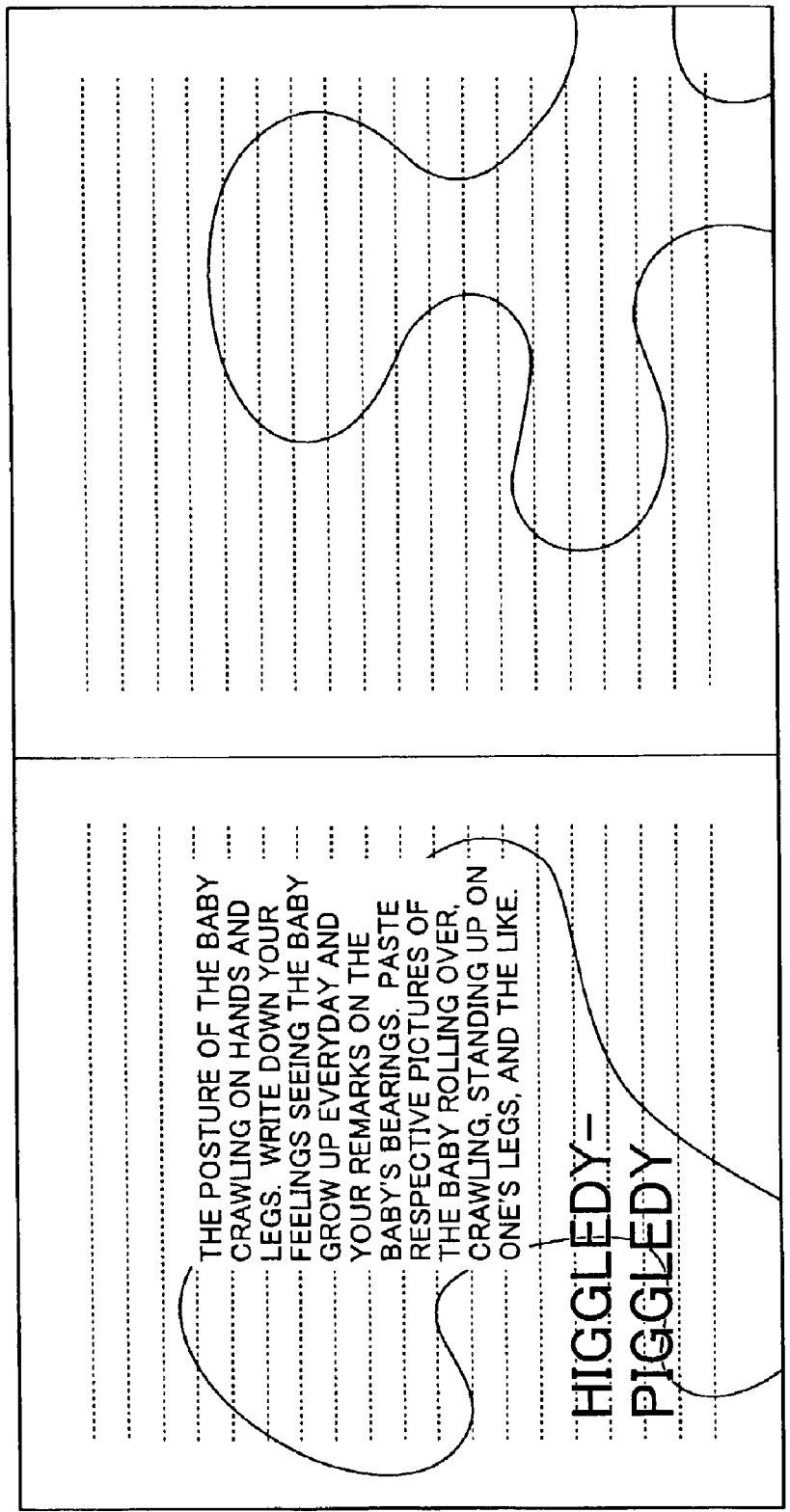
FIG. 18 shows a double spread page having a beacon and a onomatopoetic word printed in advance.
Figure 19:
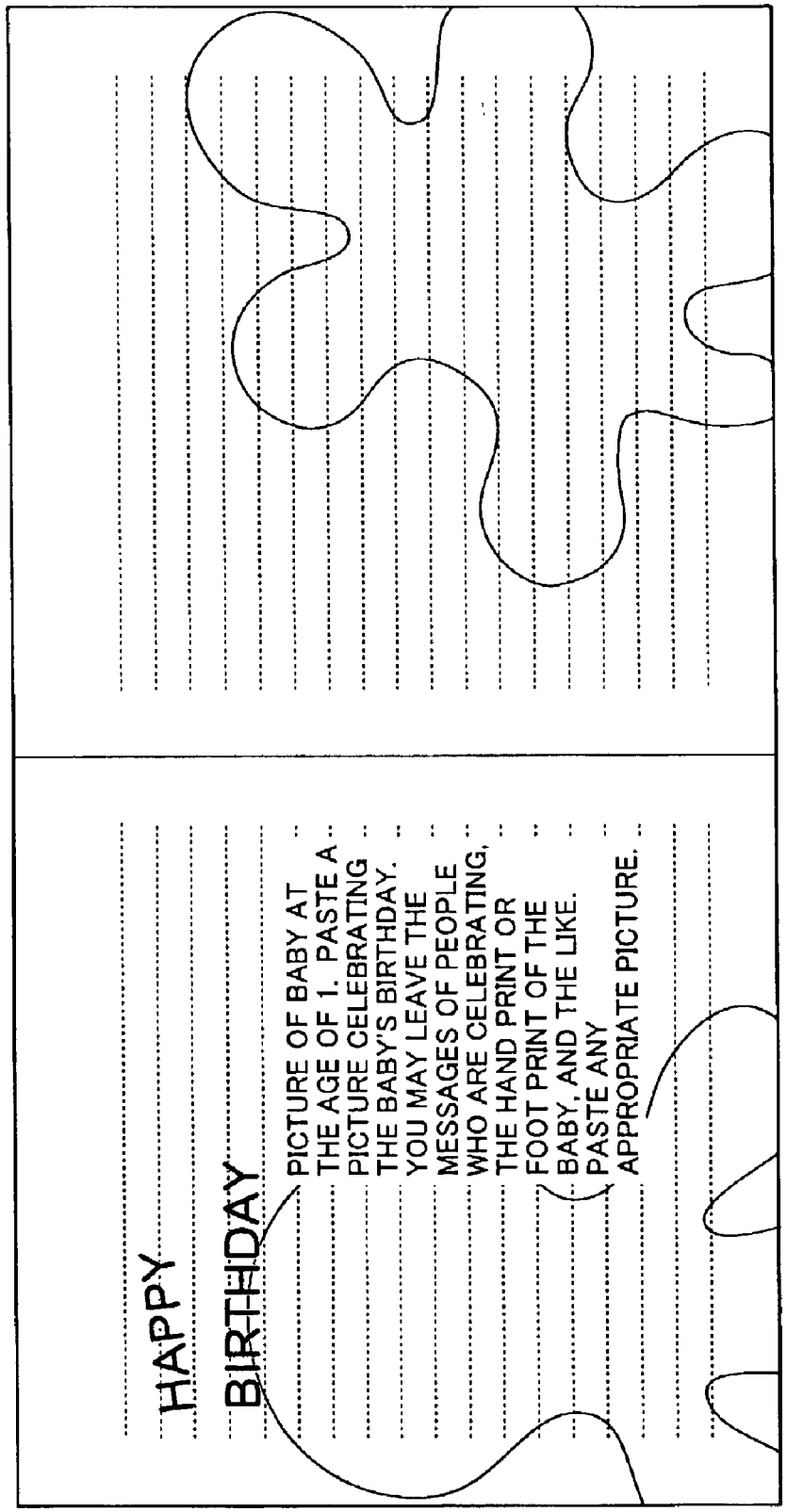
FIGS. 19 and 20 show double spread pages having beacons printed in advance.
Figure 20:
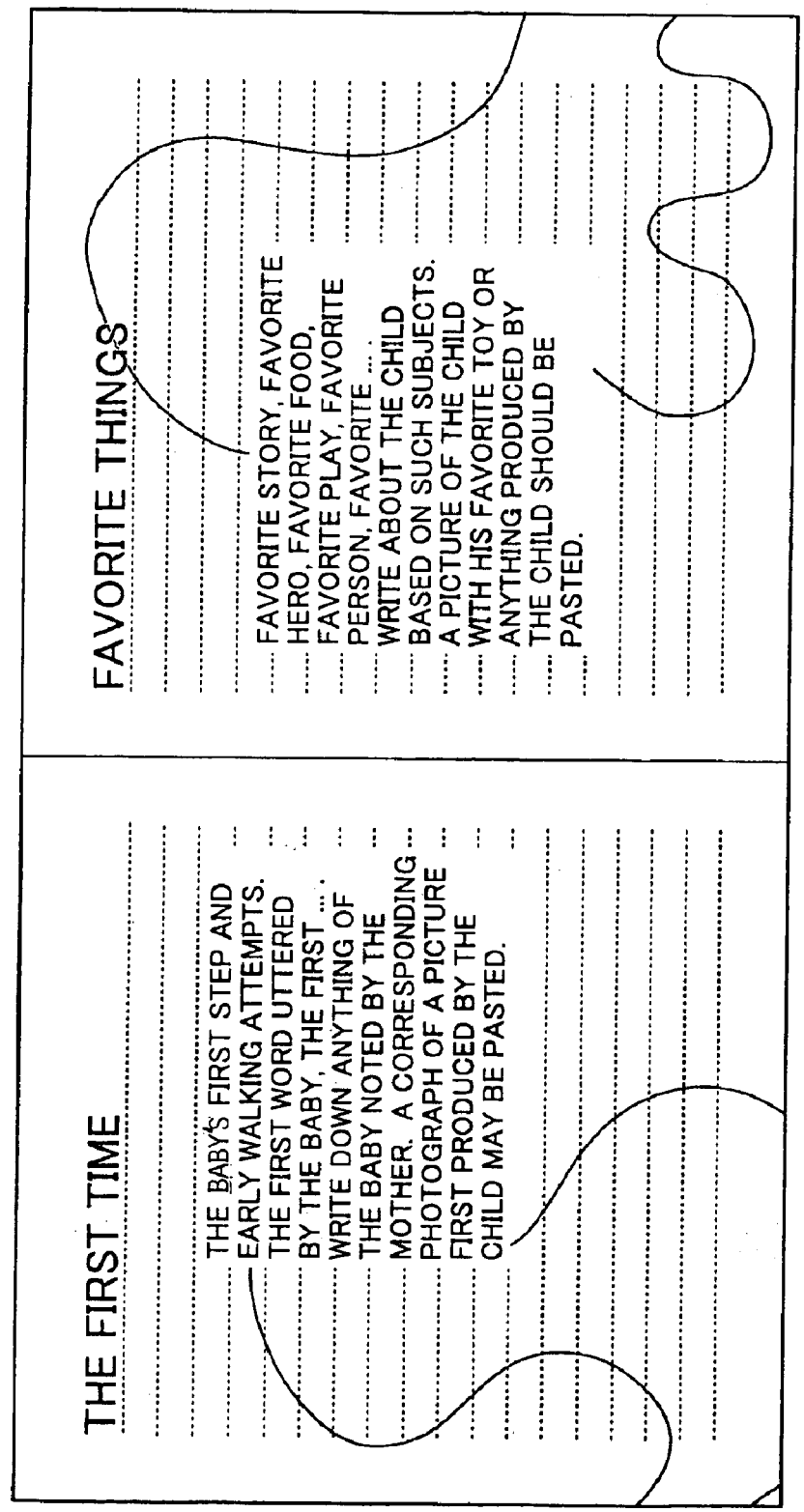
Figure 21:
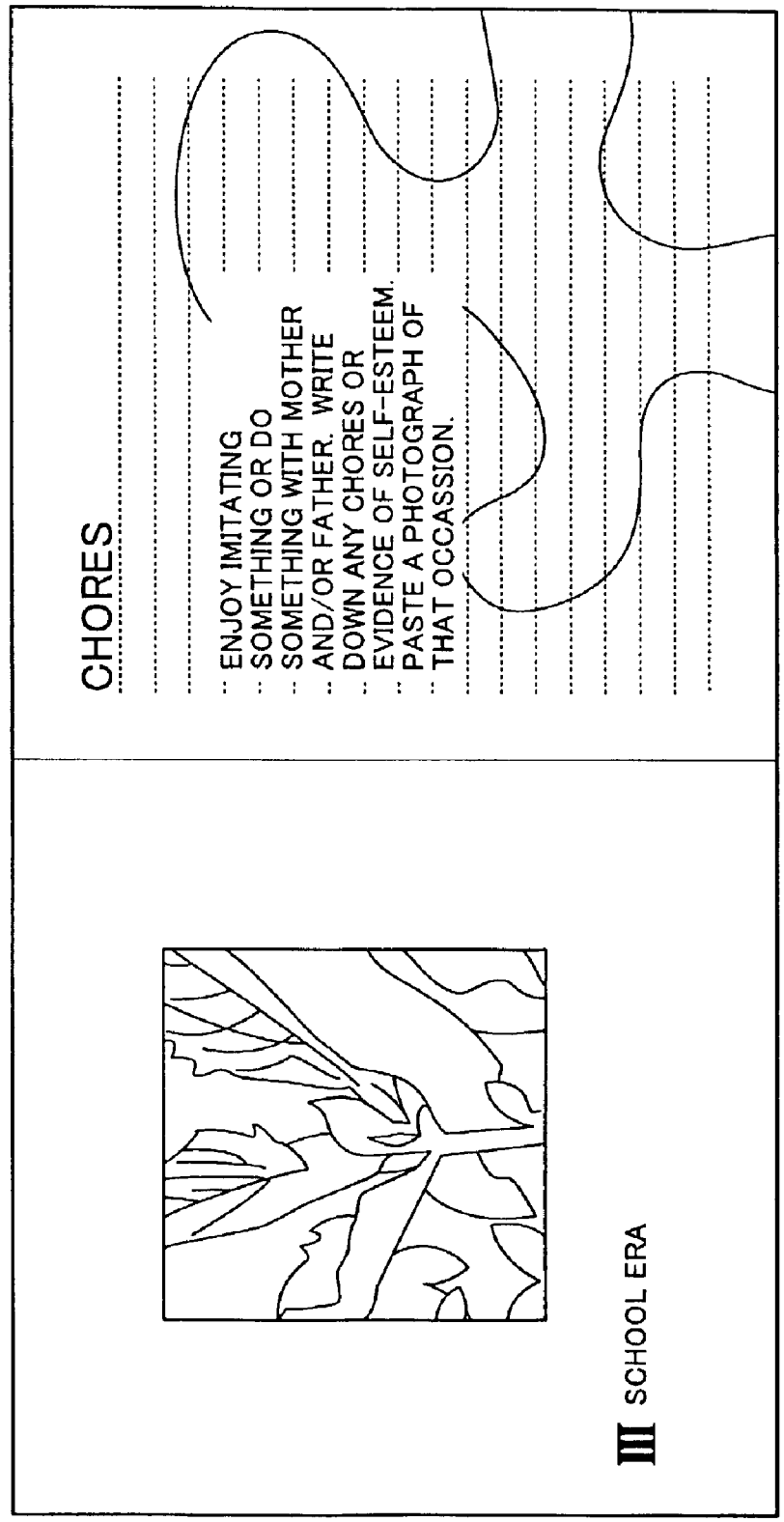
FIG. 21 shows a double spread page illustrating the beginning of a record of the school age.
Figure 22:
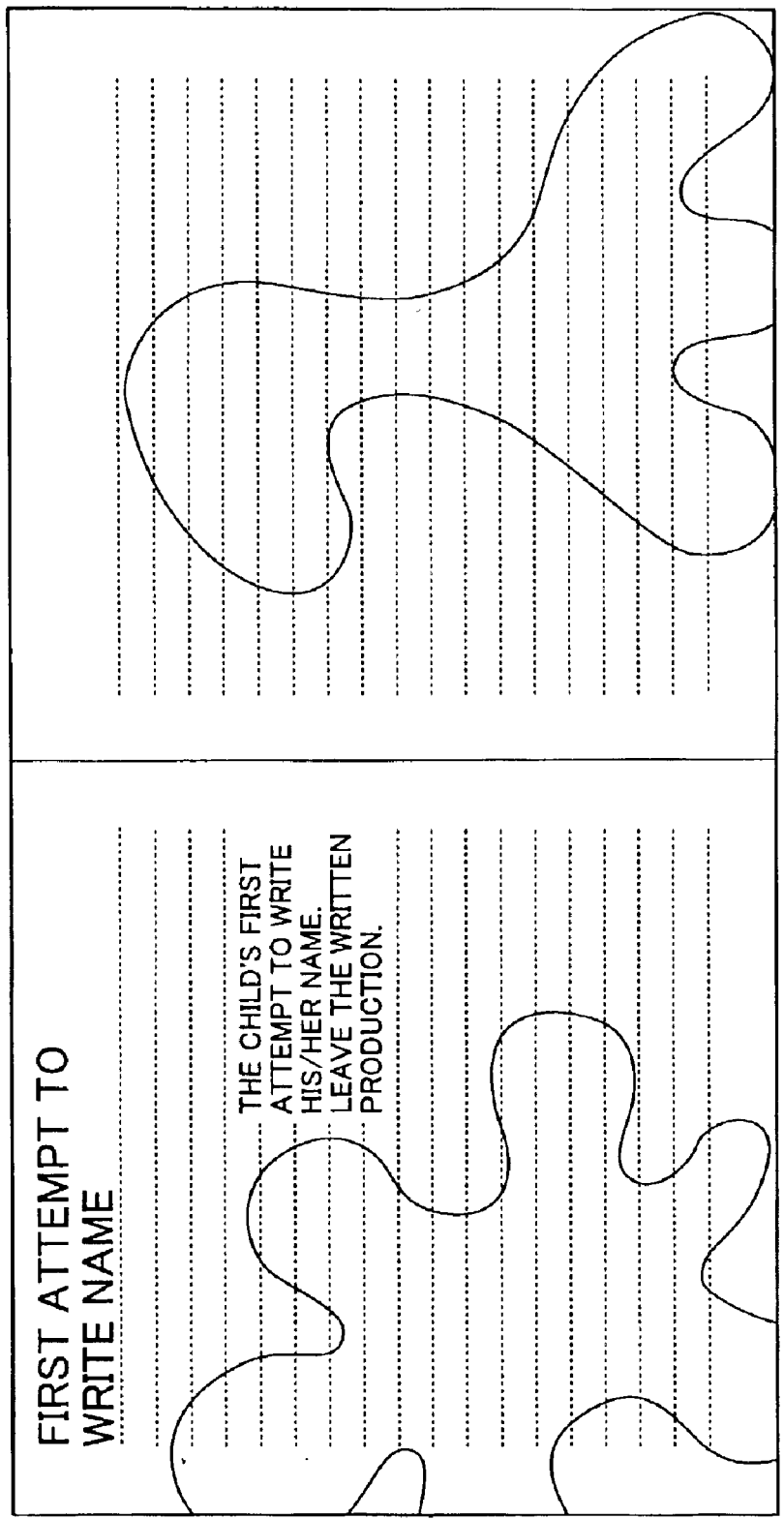
FIGS. 22, 23 and 24 show double spread pages having beacons printed in advance.
Figure 23:
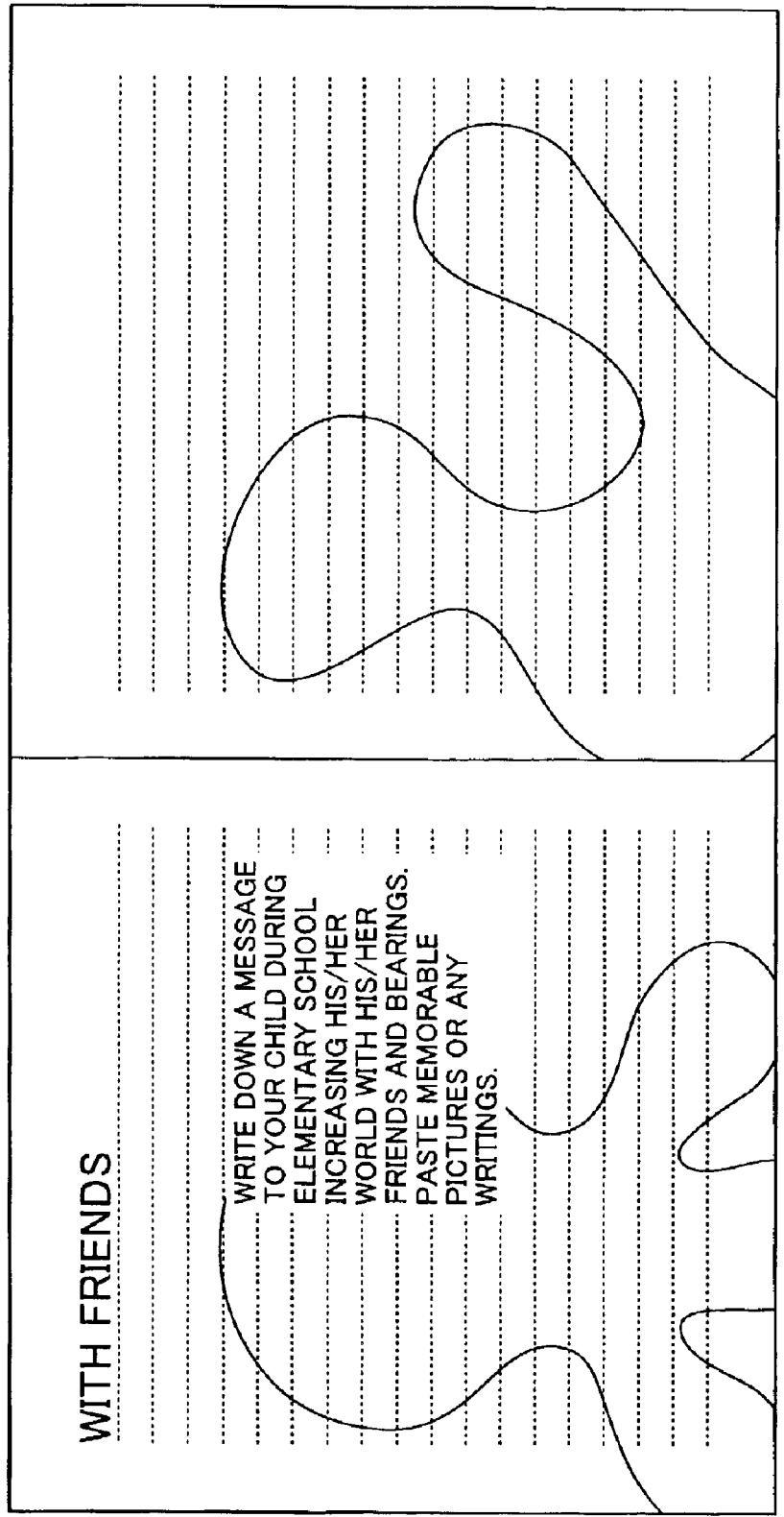
Figure 24:
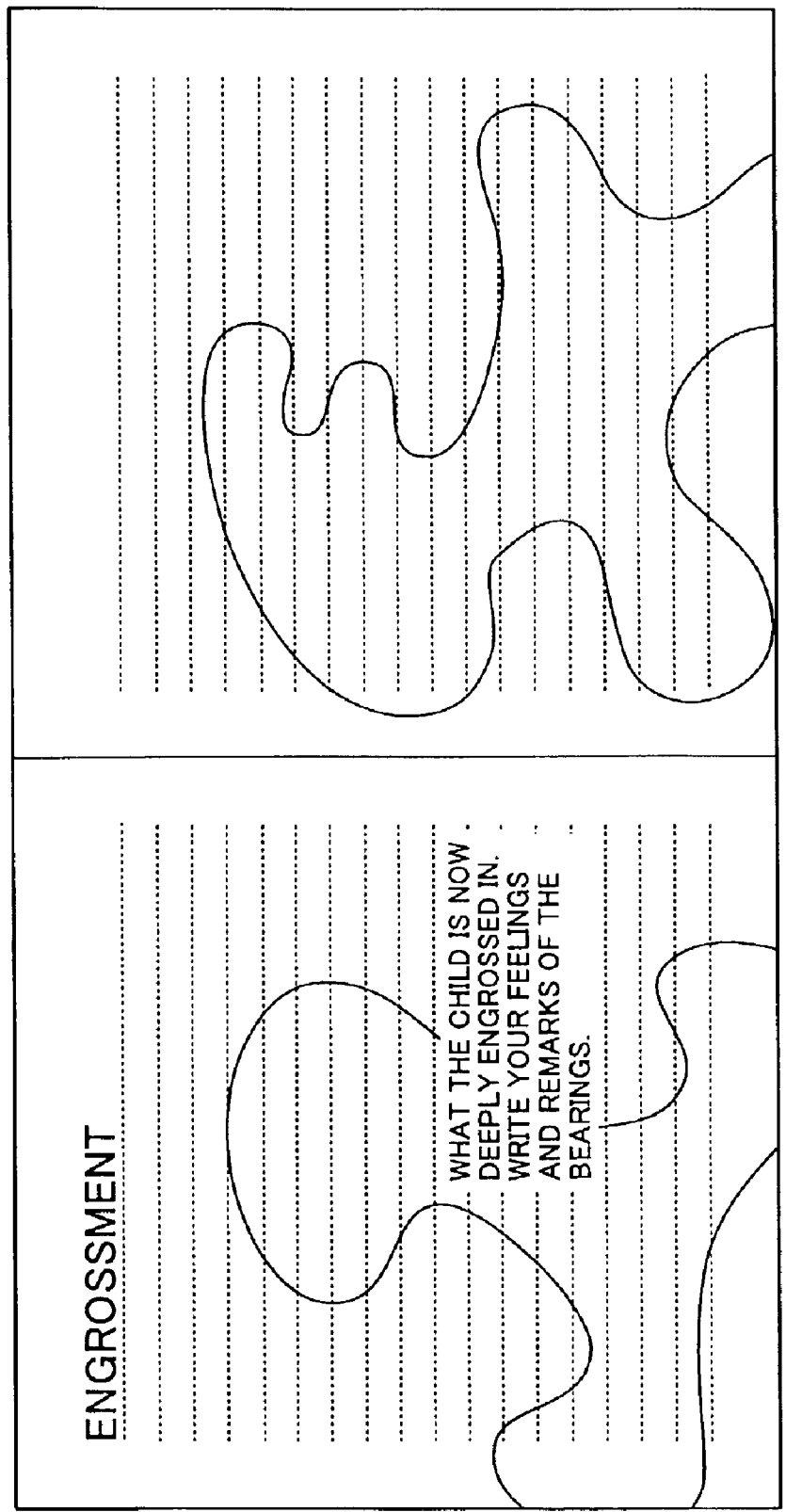

FIG. 10 and FIG. 11

The four pages shown in FIGS. 10 and 11 are arranged so that, in an unfolded state, they can be laterally viewed in series. In the state where the log is closed, the two pages shown in FIG. 10 are folded at the center line. Similarly, the two pages in FIG. 11 are also folded up at the center line and bound.

The "fetus era", "newborn era", "school era", "grown-up era" and "mature-age era" are explicitly marked. The status of the parent or child at respective era is represented by a photograph or picture. Also, the modification of the nurture product used in each era together with the symbol character is shown by means of a photograph or picture.

By appropriately combining the symbol character, log, and product corresponding to the current era from the earliest period of life up to the mature-age era, the feelings of "prayer for children" and "an affectionate heart" can be retained continuously. The devotion of the child is succeeded by the child, which can be further succeeded by the grandchild.

FIG. 12

The first double spread page of the record from the fetus era. On the left page, "fetus era" is printed together with an illustration, explicitly indicating the beginning of the record of the fetus era.

On the right page, the beacon or instructional text or message set forth below is printed in advance to inspire the parent to frankly write down his/her feelings during the fetus era.

"Write father's/mother's feelings when learning of conception as if speaking to the baby in the womb. Also paste a picture of mother and/or father at the time of learning about pregnancy. Write and paste a picture as you like."

By having the parent write down his/her feelings according to the above beacon, the parent's devotion and deep affection towards the child can be left in a visual form. When the child grows up and reads the record written by his/her parents, the child can be conscious of the love offered at the earliest period of life to feel that he/she has been born with deep care. The child conscious of such deep affection will grow up with an affectionate heart.

On the right page, the wording of "hurray!!" is printed together with the above literal phrases as the onomatopoetic words representing the feelings of the parent at that time. By printing such an onomatopoetic word in advance, inspiration to facilitate writing is offered.

It is appreciated from the drawing that the symbol character representing "an affectionate heart" is printed in advance on the page where a record is to be written. The contour of the symbol character may be represented in a line or the symbol character may be represented in a different color.

FIG. 13

This double spread page is a region where the parent can write down a record arbitrarily. On each page, the symbol character representative of "an affectionate heart" appears so that the parent can bear tender affection.

FIG. 14

The beacon set forth below is printed in advance on the left side of the double spread page.

"Express your feelings when you first met the baby in the womb through ultrasonic tomography, and/or write down a message to the baby in the womb."

The onomatopoetic word of "howdy!!" representative of that time is also printed in advance.

FIG. 15

On the left side of the double spread page, the beacon set forth below is printed in advance.

"The baby kicks in the womb for the first time. Express your feelings at that time or condition at that time. Paste the picture of father or caretaker."

The father and mother will feel excited when the baby first kicks in the womb, and will be in sheer bliss. By writing down the emotions of that time in the log, a life log filled with the parents' affection and tenderness can be succeeded by the child.

The onomatopoetic word of "thump-thump" is printed in advance together with the above beacon to produce an atmosphere to facilitate writing.

FIG. 16

At the right side of the double spread page, a beacon set forth below is printed in advance.

"The expected date is coming. Write down your present feelings. Also, paste a picture of mother at the later months of pregnancy."

Also, an onomatopoetic word of "flutter-patter" representing the feelings at that time is printed in advance together with the above beacons to produce an atmosphere to facilitate writing of the parents feelings.

FIG. 17

From this page, the record of the newborn era begins. On the left side of the double spread page, the phrase of "newborn era" is explicitly indicated together with an illustration.

At the right page, the beacon set forth below is printed in advance.

"Write a message to the baby from mother and/or father when the baby is born. Paste the first picture of the baby. You may write any episodes in determining the baby's name or your sincere wish in the name."

The onomatopoetic word of "ba-boo!!" indicating the birth is printed in advance together with the beacon.

By writing down the emotions when the baby is born as well as the wish for the baby to grow up sound and healthy, the child can appreciate the deep devotion towards the child when the child has grown up.

FIG. 18

On the left side of the double spread page, the beacon set forth below is printed in advance.

"The posture of the baby crawling on hands and legs. Write down your feelings seeing the baby grow up everyday and your remarks on the baby's bearing. Paste respective pictures of the baby rolling over, crawling, standing up on one's legs, and the like."

Also, the onomatopoetic word "higgledy-piggledy" is printed in advance together with the above beacon.

FIG. 19

The beacon set forth below is printed in advance on the left side of double spread page.

"Picture of baby at the age of 1. Paste a picture celebrating the baby's birthday. You may leave the messages of people who are celebrating, the hand print or foot print of the baby, and the like. Paste any appropriate picture."

Also the phrase of "HAPPY BIRTHDAY" is printed in advance together with the above beacon.

FIG. 20

The beacon set forth below is printed in advance on the left side of the double spread page.

"The baby's first step and early walking attempts. The first word uttered by the baby, the first . . . . Write down anything of the baby noted by the mother. A corresponding photograph of a picture first produced by the child may be pasted."

The expression of "the first time . . . " corresponding to the first action of the baby is printed together with the above beacon.

At the right side of double spread page, the beacon set forth below is printed.

"Favorite story, favorite hero, favorite food, favorite play, favorite person, favorite . . . . Write about the child based on such subjects. A picture of the child with his favorite toy or anything produced by the child should be pasted."

The caption of "FAVORITE THINGS" is printed in advance together with the above beacon.

FIG. 21

From this page, the record of "school age" begins. On the left side of the double spread page, the caption of "school era" is explicitly stated together with an illustration.

On the right side of the double spread page, the beacon set forth below is printed in advance.

"Enjoy imitating something or do something with mother and/or father. Write down any chores or evidence of self-esteem. Paste a photograph of that occasion."

The caption of "Chores" is printed in advance together with the above beacon.

FIG. 22

On the left side of the double spread page, the beacon set forth below is printed in advance.

"The child's first attempt to write his/her name. Leave the written production."

On this page, the caption of "First attempt to write name" is printed in advance.

FIG. 23

On the left side of the double spread page, the beacon set forth below is written in advance.

"Write down a message to your child during elementary school increasing his/her world with his/her friends and bearings. Paste memorable pictures or any writings."

On this page, the caption of "With friends" is printed in advance.

FIG. 24

On the left side of the double spread page, the beacon set forth below is printed in advance.

"What the child is now deeply engrossed in. Write your feelings and remarks of the bearings."

On this page, the caption of "Engrossment" is printed in advance.

FIG. 25

From this page, the record of "grown-up era" begins.

On the left side of the double spread page, the recitation of "grown-up" is printed together with the beacon set forth below as a guidance toward the child.

"Until now, your father and/or mother has entered the record. From here, write down for yourself."

Although guidance was provided to facilitate the parent to write down a record during the "fetus era", "newborn era" and "school era", guidance is now provided so that the child will write for himself/herself thereafter from this page of the "grown-up era". When the child grows up to adulthood, this log is succeeded or passed from the parent to the child. The child reading over the succeeded log will recognize the deep devotion of his/her parents from the earliest period of life up to the school era. When the child becomes conscious of being born with deep care and has grown-up in an environment of deep affection and tenderness, the child will be filled with heartwarming emotions to retain a sincere mind.

When the child gets married and has his/her own children, the child can similarly offer the deep devotion from his/her parents to his/her own child. The child can continuously write down into the log succeeded from his/her parents of his own record. Concurrently, the child can write down into a new life log prepared for his/her child now as a parent. Thus, the affection and heartwarming emotion between parent and child can be succeeded by the next generation.

Figure 25:
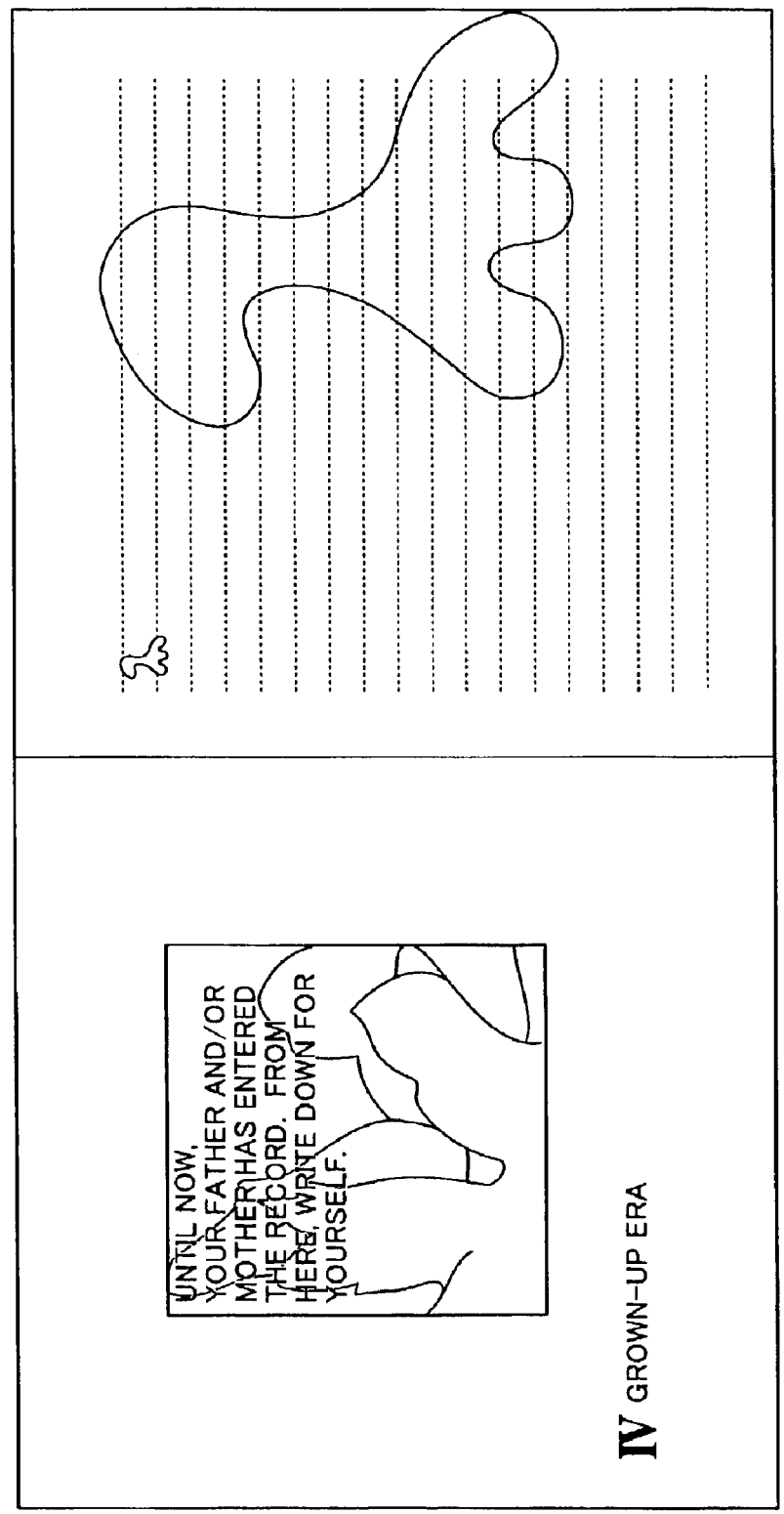
FIG. 25 shows a double spread page illustrating the beginning of a record of a grown-up era.
Figure 26:
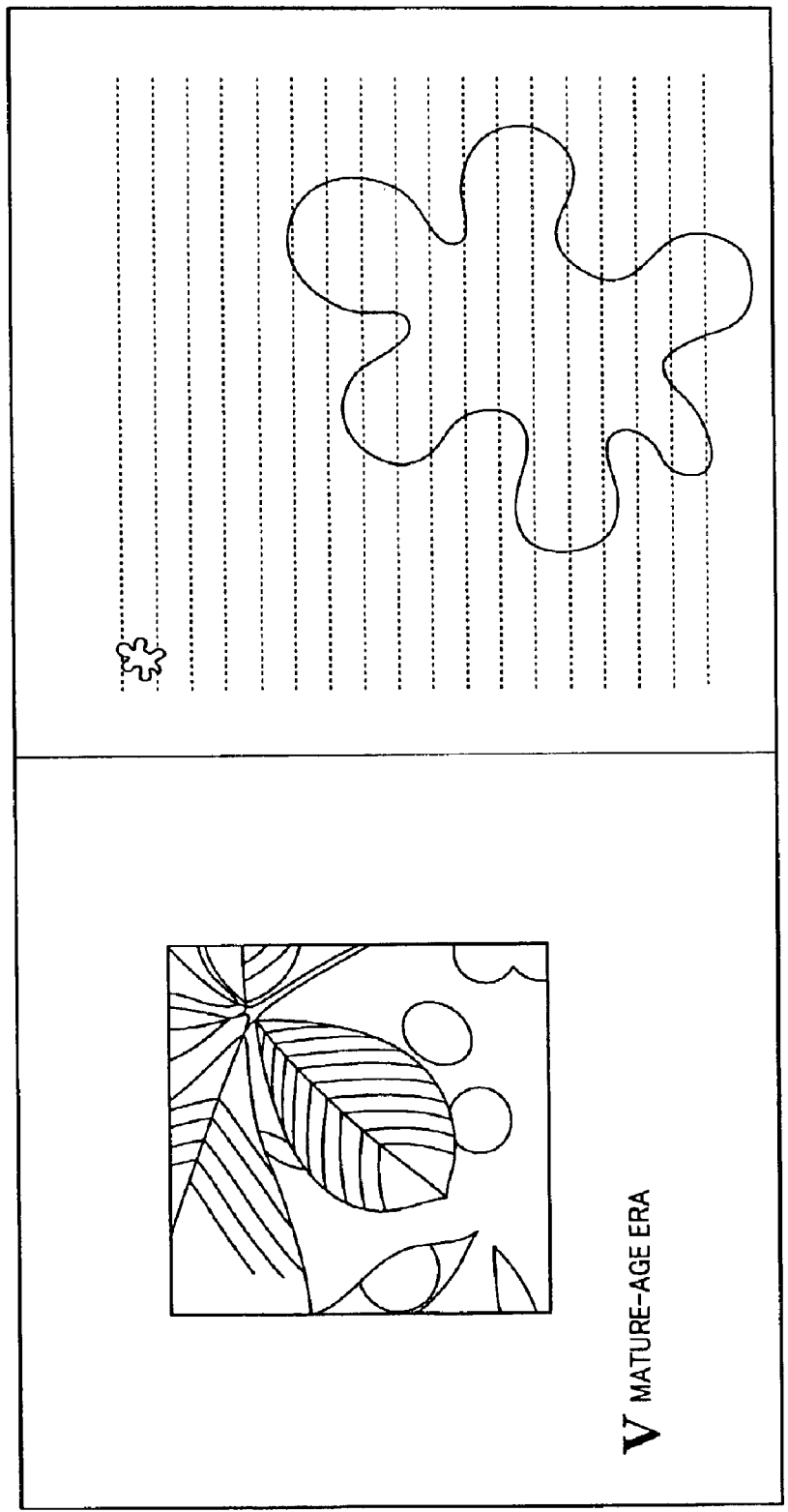
FIG. 26 shows a double spread page illustrating the beginning of a record of a mature-age era.
Figure 27:
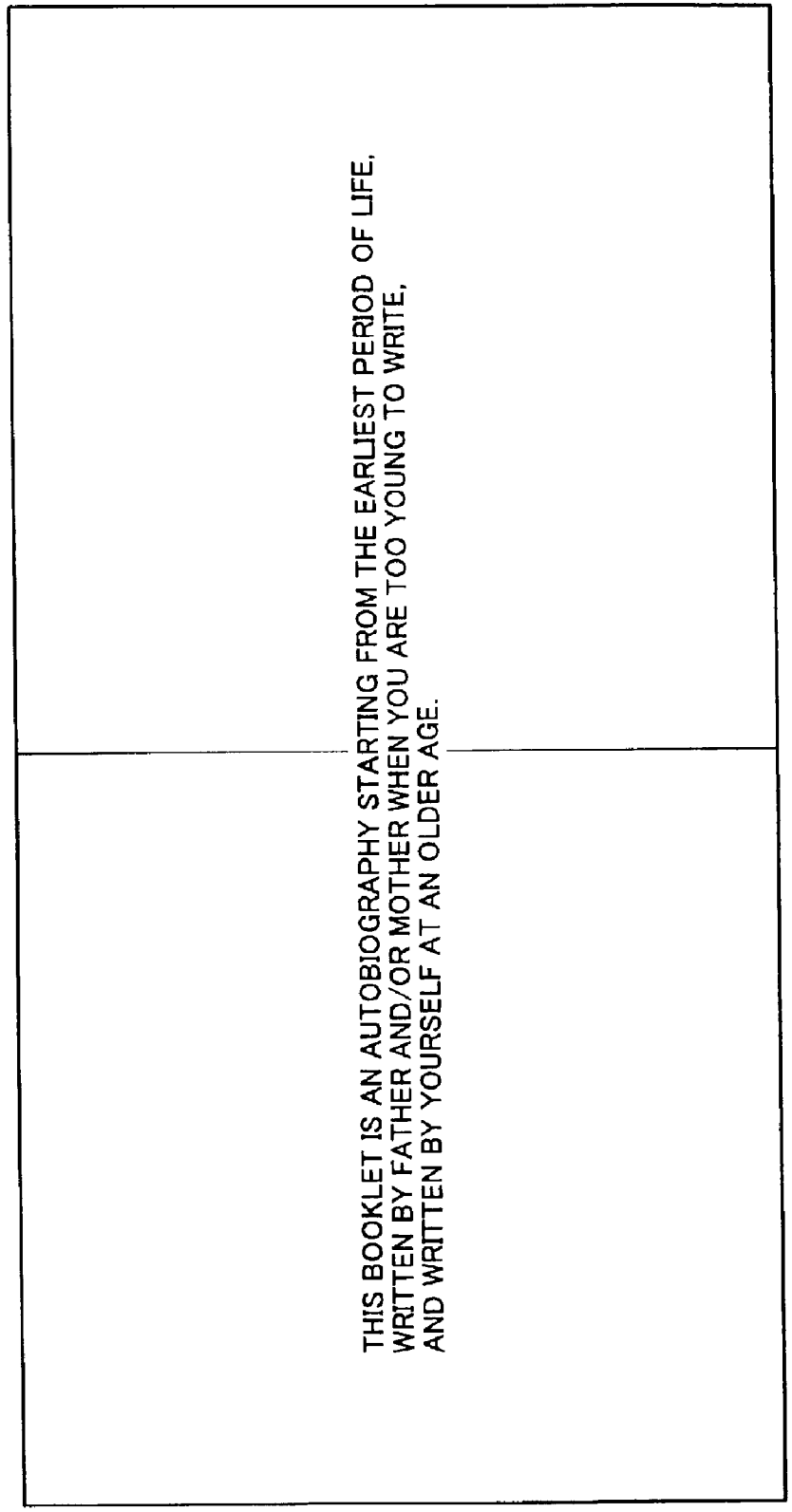
FIG. 27 shows the last double spread page of the life log.

The right side of the double spread page shown in FIG. 25 is the region where the child is to write for himself/herself. The symbol character representing "an affectionate heart" is printed in advance. Upon seeing the symbol character imprinted with the memories from his/her childhood, the child can access the log with a sincere and affectionate heart.

FIG. 26

From this stage, the record of "mature-age era" begins. An autobiography of one's life from the fetus era up to the mature-age era can be completed by continuously writing down on this log until the child comes to the mature age.

This autobiography is a log of love produced by parent and child under heartwarming relationship. The parent and child can share affection, joy and emotions through this log. By this log, the parent and child can hold sincere and heartwarming feelings in a natural manner. The log is devised so that the memories of affection from parent to child during the childhood can be continuously retained in the child's mind even after the child has grown up. Thus, this life log can function as a "devotion product" for a person to enjoy happiness.

FIG. 27

The last double spread page of the life log. The nature of the life log is summarized in the literary phrase set forth below.

"This booklet is an autobiography starting from the earliest period of life, written by father and/or mother when you are too young to write, and written by yourself at an older age."

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A nurturing system comprising a life journal and a convertible article, wherein:
   (a) said life journal is adapted to have biographical information recorded therein regarding a subject person throughout a childhood and adulthood of the subject person,
   (b) said life journal includes:
      a first journal section including at least one first instructional message adapted to prompt a parent of the subject person to record in said first journal section first information regarding the subject person during the childhood of the subject person when the subject person is too young and not able to record the first information; and
      a second journal section including at least one second instructional message adapted to prompt the subject person to autobiographically record in said second journal section second information regarding the subject person during the adulthood of the subject person when the subject person is old enough and able to record the second informations;
   (c) said life journal comprises a book comprising a cover and plural pages, said first and second instructional messages are first and second instructional texts printed on said pages of said book, and said book includes writing spaces on said pages adapted to have the first and second information written therein as first and second written informations;

(d) said life journal further has at least one symbolic character represented on said cover of said book and on each one of said pages of said book having said writing spaces adapted to have the first and second written informations written therein;

(e) said convertible article can be selectively configured as a baby's playing device adapted for use by the subject person during the childhood and as at least one home furnishing adapted for use by the parent or by the subject person during the adulthood, wherein said at least one symbolic character is further represented on said convertible article both when configured as said baby's playing device and when configured as said at least one home furnishing;

(f) said baby's playing device is a baby's play gym, said at least one home furnishing is at least one of a magazine rack and a chair, and said convertible article comprises a system of components including:

first and second side supports arranged spaced apart from one another;

a plurality of hanger bars that each extend between and interconnect said first side support and said second side support;

a plurality of baby's play toys; and a strip member;

wherein:

when said system of components is configured as said baby's play gym, paid baby's play toys are suspended from one or more of said hanger bars; and when said system of components is configured as said magazine rack or as said chair, said strip member is secured to and suspended from at least two of said hanger bars to form a suspended sling of said strip member that is adapted to support at least one of magazines and books placed on said suspended sling or the subject person or the parent seated on said suspended sling, wherein said strip member can be suspended from at least one of said hanger bars from which said baby's play toys can be suspended when said system of components is configured as said baby's play gym.

2. The nurturing system according to claim 1, wherein at least one of said baby's play toys has a configuration representing said at least one symbolic character.

3. The nurturing system according to claim 1, wherein:

when said system of components is configured as said baby's play gym, said strip member is removed and separated from said hanger bars; and when said system of components is configured as said magazine rack or as said chair, said baby's play toys are removed and separated from said hanger bars.

* * * * *